US008868542B2

(12) United States Patent
Kimball et al.

(10) Patent No.: US 8,868,542 B2
(45) Date of Patent: *Oct. 21, 2014

(54) CUSTOMIZED USER INTERFACE BASED ON USER PROFILE INFORMATION

(75) Inventors: Jeffrey David Kimball, Great Falls, VA (US); John Thurston Wassom, Jr., Rathcoole (IE); Christina Ann Rank Dolan, Manassas, VA (US)

(73) Assignee: Facebook, Inc., Menlo Park, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/059,157

(22) Filed: Mar. 31, 2008

(65) Prior Publication Data
US 2008/0184146 A1 Jul. 31, 2008

Related U.S. Application Data

(63) Continuation of application No. 10/134,675, filed on Apr. 30, 2002, now Pat. No. 7,353,234, which is a continuation-in-part of application No. 09/224,211, filed on Dec. 30, 1998, now Pat. No. 7,555,721.

(51) Int. Cl.
*G06F 3/00* (2006.01)
*G06F 17/30* (2006.01)
*G06F 3/0484* (2013.01)
*G06F 3/048* (2013.01)
*G06F 3/0481* (2013.01)

(52) U.S. Cl.
CPC .......... *G06F 3/048* (2013.01); *G06F 17/30899* (2013.01); *G06F 3/0484* (2013.01); *Y10S 707/99939* (2013.01); *G06F 3/0481* (2013.01); *G06F 17/30867* (2013.01); *Y10S 707/99943* (2013.01)

USPC .......... 707/710; 707/783; 715/745; 715/810; 707/999.009; 707/999.102

(58) Field of Classification Search
USPC .......... 707/804, 807, 999.102, 999.203, 710, 707/783; 345/418; 715/745, 810
See application file for complete search history.

(56) References Cited

U.S. PATENT DOCUMENTS 4,706,121 A 11/1987 Young
5,115,501 A 5/1992 Kerr
(Continued)

FOREIGN PATENT DOCUMENTS

WO 97/34388 9/1977

OTHER PUBLICATIONS

"Alexa 3.0 Delivers More Useful and Dynamic Information with Customizable Interface", Nov. 23, 1998, http://www.alexa.com/press/press_release/alexa_30_release.html, pp. 1-2.

(Continued)

*Primary Examiner* — Marc Filipczyk
(74) *Attorney, Agent, or Firm* — Keller Jolley Preece

(57) ABSTRACT

A user interface including one or more references to content is customized. Several user profiles are provided from which a user may be associated. Each user profile includes user profile information. The user profile associated with a user to whom a user interface will be provided is accessed. A user interface is configured for the user, based at least in part upon the user profile accessed as being associated with the user. Access to content is enabled based on user manipulation of the configured user interface.

26 Claims, 17 Drawing Sheets

(56) References Cited

U.S. PATENT DOCUMENTS

| | | | | |
|---|---|---|---|---|
| 5,253,066 | A | 10/1993 | Vogel | |
| 5,341,293 | A | 8/1994 | Vertelney et al. | |
| 5,347,628 | A | 9/1994 | Brewer et al. | |
| 5,442,788 | A | 8/1995 | Bier | |
| 5,463,727 | A * | 10/1995 | Wiggins et al. | 715/841 |
| 5,479,268 | A | 12/1995 | Young et al. | |
| 5,533,184 | A | 7/1996 | Malcolm | |
| 5,551,037 | A | 8/1996 | Fowler et al. | |
| 5,553,233 | A | 9/1996 | Ikeda | |
| 5,596,702 | A | 1/1997 | Stucka et al. | |
| 5,600,776 | A | 2/1997 | Johnson et al. | |
| 5,625,783 | A | 4/1997 | Ezekiel et al. | |
| 5,664,739 | A | 9/1997 | Black et al. | |
| 5,678,041 | A | 10/1997 | Baker et al. | |
| 5,696,898 | A | 12/1997 | Baker et al. | |
| 5,745,109 | A | 4/1998 | Nakano et al. | |
| 5,761,662 | A | 6/1998 | Dasan | |
| 5,764,906 | A | 6/1998 | Edelstein et al. | |
| 5,796,393 | A | 8/1998 | McNaughton et al. | |
| 5,809,204 | A | 9/1998 | Young et al. | |
| 5,818,446 | A | 10/1998 | Bertram et al. | |
| 5,835,087 | A | 11/1998 | Herz et al. | |
| 5,880,730 | A | 3/1999 | Durand | |
| 5,881,225 | A | 3/1999 | Worth | |
| 5,907,831 | A | 5/1999 | Lotvin et al. | |
| 5,914,714 | A | 6/1999 | Brown | |
| 5,917,491 | A | 6/1999 | Bauersfeld | |
| 5,937,163 | A | 8/1999 | Lee et al. | |
| 5,956,029 | A | 9/1999 | Okada et al. | |
| 5,959,630 | A | 9/1999 | Takeuchi et al. | |
| 5,966,533 | A | 10/1999 | Moody | |
| 5,978,799 | A | 11/1999 | Hirsch | |
| 5,983,270 | A | 11/1999 | Abraham et al. | |
| 5,987,611 | A * | 11/1999 | Freund | 726/4 |
| 5,991,807 | A | 11/1999 | Schmidt et al. | |
| 5,995,101 | A * | 11/1999 | Clark et al. | 715/711 |
| 6,005,566 | A | 12/1999 | Jones et al. | |
| 6,009,410 | A | 12/1999 | LeMole et al. | |
| 6,012,090 | A | 1/2000 | Chung et al. | |
| 6,014,638 | A | 1/2000 | Burge et al. | |
| 6,037,934 | A | 3/2000 | Himmel et al. | |
| 6,057,836 | A | 5/2000 | Kavalam et al. | |
| 6,065,047 | A | 5/2000 | Carpenter et al. | |
| 6,069,628 | A | 5/2000 | Farry et al. | |
| 6,072,486 | A | 6/2000 | Sheldon et al. | |
| 6,075,528 | A | 6/2000 | Curtis | |
| 6,091,411 | A | 7/2000 | Straub et al. | |
| 6,097,385 | A | 8/2000 | Robinson | |
| 6,097,389 | A | 8/2000 | Morris et al. | |
| 6,104,334 | A | 8/2000 | Allport | |
| 6,121,968 | A | 9/2000 | Arcuri et al. | |
| 6,128,663 | A | 10/2000 | Thomas | |
| 6,133,915 | A | 10/2000 | Arcuri et al. | |
| 6,141,010 | A | 10/2000 | Hoyle | |
| 6,157,953 | A | 12/2000 | Chang et al. | |
| 6,161,139 | A | 12/2000 | Win et al. | |
| 6,173,269 | B1 | 1/2001 | Solokl et al. | |
| 6,184,886 | B1 | 2/2001 | Bates et al. | |
| 6,188,401 | B1 | 2/2001 | Peyer | |
| 6,208,995 | B1 | 3/2001 | Himmel et al. | |
| 6,211,871 | B1 | 4/2001 | Himmel et al. | |
| 6,212,522 | B1 | 4/2001 | Himmel et al. | |
| 6,232,972 | B1 | 5/2001 | Arcuri et al. | |
| 6,252,591 | B1 | 6/2001 | Dockweiler et al. | |
| 6,256,032 | B1 | 7/2001 | Hugh | |
| 6,256,739 | B1 | 7/2001 | Skopp et al. | |
| 6,266,001 | B1 | 7/2001 | Fang et al. | |
| 6,266,060 | B1 * | 7/2001 | Roth | 715/853 |
| 6,282,548 | B1 | 8/2001 | Burner et al. | |
| 6,286,001 | B1 * | 9/2001 | Walker et al. | 707/697 |
| 6,292,827 | B1 * | 9/2001 | Raz | 709/217 |
| 6,297,819 | B1 | 10/2001 | Furst | |
| 6,396,515 | B1 | 5/2002 | Hetherington et al. | |
| 6,401,094 | B1 | 6/2002 | Stemp et al. | |
| 6,421,669 | B1 | 7/2002 | Gilmour et al. | |
| 6,473,800 | B1 | 10/2002 | Jerger et al. | |
| 6,480,852 | B1 * | 11/2002 | Himmel et al. | 1/1 |
| 6,483,523 | B1 * | 11/2002 | Feng | 715/745 |
| 6,484,156 | B1 | 11/2002 | Gupta et al. | |
| 6,487,557 | B1 | 11/2002 | Nagatomo | |
| 6,557,015 | B1 | 4/2003 | Bates et al. | |
| 6,628,314 | B1 | 9/2003 | Hoyle | |
| 6,741,967 | B1 | 5/2004 | Wu et al. | |
| 6,742,030 | B1 | 5/2004 | MacPhail | |
| 6,785,728 | B1 | 8/2004 | Schneider et al. | |
| 6,785,822 | B1 * | 8/2004 | Sadhwani-Tully | 726/28 |
| 6,788,315 | B1 | 9/2004 | Kekic et al. | |
| 6,816,849 | B1 * | 11/2004 | Halt, Jr. | 1/1 |
| 6,832,350 | B1 | 12/2004 | Bates et al. | |
| 6,934,697 | B1 | 8/2005 | Warren | |
| 7,353,234 | B2 * | 4/2008 | Kimball et al. | 1/1 |
| 7,555,721 | B2 | 6/2009 | Wassom et al. | |
| 2002/0059402 | A1 | 5/2002 | Belanger | |
| 2002/0091697 | A1 | 7/2002 | Huang et al. | |
| 2002/0095415 | A1 | 7/2002 | Walker et al. | |
| 2002/0107946 | A1 | 8/2002 | Albers | |
| 2002/0186255 | A1 | 12/2002 | Shafron et al. | |
| 2003/0028532 | A1 | 2/2003 | Dougu et al. | |
| 2004/0165007 | A1 | 8/2004 | Shafron | |
| 2005/0004978 | A1 | 1/2005 | Reed et al. | |
| 2006/0149833 | A1 | 7/2006 | Dan et al. | |
| 2007/0121850 | A1 | 5/2007 | Klos et al. | |
| 2010/0031161 | A1 | 2/2010 | Wassom et al. | |
| 2013/0097523 | A1 | 4/2013 | Kimball et al. | |
| 2013/0097536 | A1 | 4/2013 | Kimball et al. | |
| 2013/0097537 | A1 | 4/2013 | Kimball et al. | |
| 2013/0151984 | A1 | 6/2013 | Kimball | |

OTHER PUBLICATIONS

"Web Surfing Gets Down to Business with Alexa 3.0", Oct. 7, 1998, http://www.alexa.com/press/press_releases/alexa_30.html, pp. 1-3.
"Ad on the Bar" Campaign Supplements Alexa's Focused Advertising Program, Dec. 10, 1997, http//www.alexa.com/press/press_releases/ad.html, pp. 1-3.
"Alexa Internet and Netscape Team to Provide Related Sites to Support Smart Browsing", http://www.alexa.com, printed Oct. 1, 1998, 1-4 pages.
Brown et al., "Using Netscape 2", Copyright 1995 by Que Corporation, p. 74.
Eric Miller, "An Introduction to the Resource Description Framework", D-Lib Magazine, May 1998, p. 1-12.
PCT Notification of Transmittal of the International Search Report for PCT International Application No. PCT/US03/13251, mailed Jun. 23, 2003, 5 pgs.
International Search Report for PCT International Application No. PCT/US99/30987, mailed Jul. 6, 2000, 2 pgs.
U.S. Appl. No. 13/727,436, Dec. 26, 2012, Kimball.
U.S. Appl. No. 13/727,440, Dec. 26, 2012, Kimball.
Office Action in U.S. Appl. No. 09/224,211, dated Nov. 17, 2000, 9 pages.
Final Office Action in U.S. Appl. No. 09/224,211, dated Apr. 9, 2001, 9 pages.
Office Action in U.S. Appl. No. 09/224,211, dated Oct. 22, 2001, 9 pages.
Office Action in U.S. Appl. No. 09/224,211, dated Apr. 2, 2002, 7 pages.
Office Action in U.S. Appl. No. 09/224,211, dated Jul. 5, 2002, 9 pages.
Final Office Action in U.S. Appl. No. 09/224,211, dated Mar. 12, 2003, 10 pages.
Office Action in U.S. Appl. No. 09/224,211, dated Jul. 15, 2005, 10 pages.
Final Office Action in U.S. Appl. No. 09/224,211, dated Jan. 5, 2006, 11 pages.
Office Action in U.S. Appl. No. 09/224,211, dated Nov. 9, 2006, 10 pages.
Final Office Action in U.S. Appl. No. 09/224,211, dated May 3, 2007, 16 pages.
Office Action in U.S. Appl. No. 09/224,211, dated Jan. 23, 2008, 14 pages.

(56) References Cited

OTHER PUBLICATIONS

Office Action in U.S. Appl. No. 09/224,211, dated Jul. 15, 2008, 24 pages.
Notice of Allowance in U.S. Appl. No. 09/224,211, dated Feb. 24, 2009, 15 pages.
Office Action in U.S. Appl. No. 10/134,675, dated Sep. 25, 2003, 13 pages.
Final Office Action in U.S. Appl. No. 10/134,675, dated Apr. 9, 2004, 11 pages.
Office Action in U.S. Appl. No. 10/134,675, dated Feb. 14, 2005, 15 pages.
Final Office Action in U.S. Appl. No. 10/134,675, dated Nov. 25, 2005, 12 pages.
Office Action in U.S. Appl. No. 10/134,675, dated Jul. 11, 2006, 11 pages.
Notice of Allowance in U.S. Appl. No. 10/134,675, dated Jan. 4, 2007, 18 pages.
Notice of Allowance in U.S. Appl. No. 10/134,675, dated Nov. 2, 2007, 24 pages.
Office Action in U.S. Appl. No. 12/493,682, dated Mar. 15, 2012, 18 pages.
Notice of Allowance in U.S. Appl. No. 12/493,682, dated Jun. 25, 2012, 13 pages.
Notice of Allowance in U.S. Appl. No. 12/493,682, dated Nov. 27, 2012, 16 pages.
Office Action in U.S. Appl. No. 13/613,763, dated Mar. 19. 2013, 18 pages.
Office Action in U.S. Appl. No. 13/613,825, dated Apr. 24, 2013, 8 pages.
Office Action in U.S. Appl. No. 13/613,852, dated Apr. 23, 2013, 9 pages.
Office Action U.S. Appl. No. 13/613,763, Jul. 15, 2013.
Office Action U.S. Appl. No. 13/613,763, Sep. 24, 2013.
Notice of Allowance, U.S. Appl. No. 13/613,763, Jun. 3, 2014.
Office Action, U.S. Appl. No. 13/613,825, Dec. 18, 2013.
Notice of Allowance, U.S. Appl. No. 13/613,825, May 16, 2014.
Office Action, U.S. Appl. No. 13/613,852, Jan. 10, 2014.
Office Action, U.S. Appl. No. 13/613,852, Mar. 21, 2014.
Office Action, U.S. Appl. No. 13/727,352, Dec. 30, 2013.

\* cited by examiner

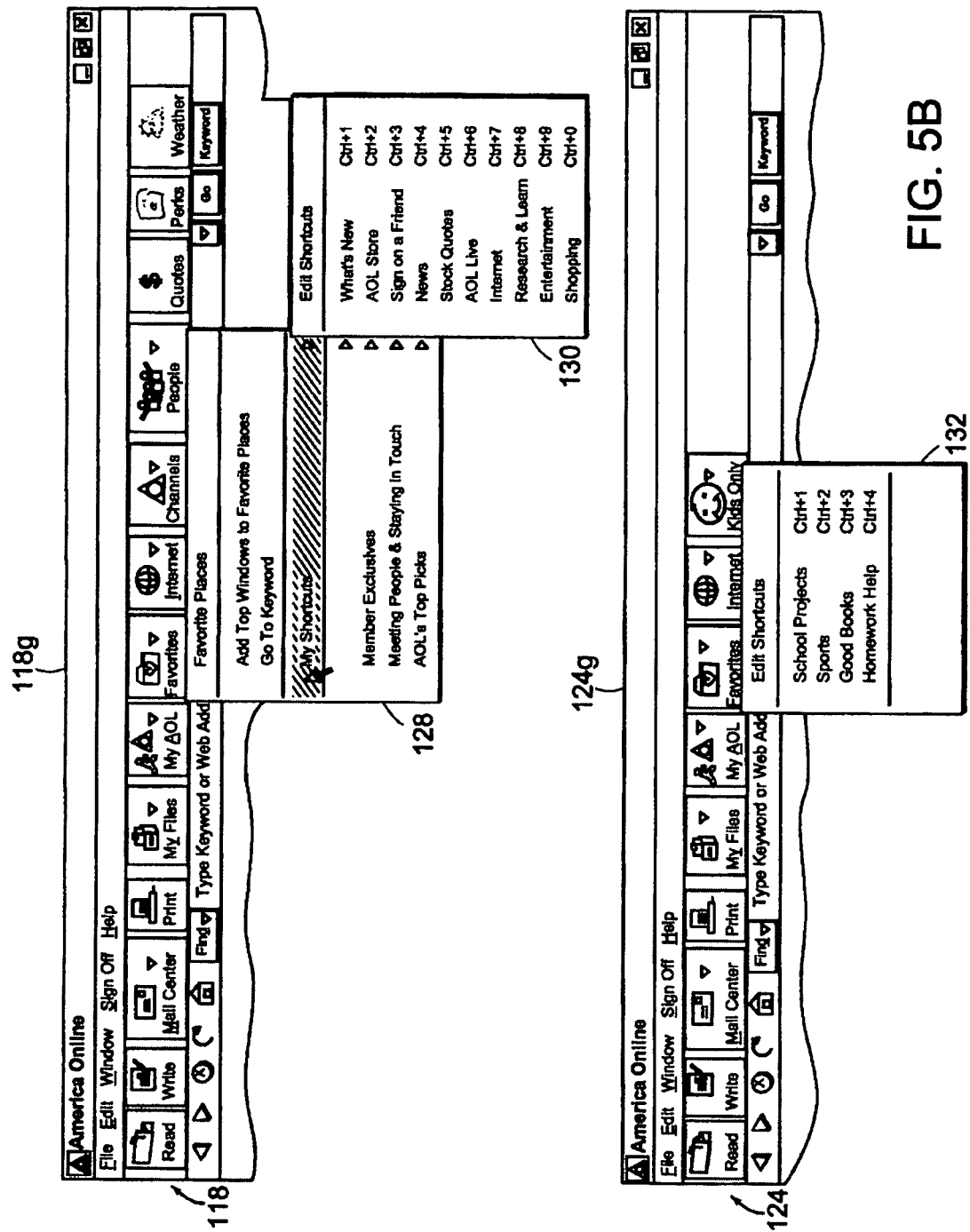

CUSTOMIZED USER INTERFACE BASED ON USER PROFILE INFORMATION

CLAIM OF PRIORITY

This application is a continuation of U.S. application Ser. No. 10/134,675, filed Apr. 30, 2002, which is a continuation-in-part of U.S. application Ser. No. 09/224,211, filed Dec. 30, 1998, which is incorporated by reference.

TECHNICAL FIELD

The following description relates to customized user interfaces, for example, graphical user interfaces (GUIs).

BACKGROUND

A GUI can include a wide variety of user interface controls that respond to user manipulation. For example, referring to FIG. 1, a Microsoft Word™ word processing application GUI 100 includes a toolbar 102 that presents a row of user input controls 102a-102j positioned in a substantially regular pattern. The controls enable a user to quickly perform common tasks such as opening 102b, saving 102c, and printing 102d a document 106. By collecting controls into an easily accessible area of the GUI 100, the toolbar 102 enables a user to quickly find and access a particular control whenever the user wants the application to perform a task associated with the selected control.

The toolbar 102 can include button controls (buttons) 102a-102g that feature pictorial representations of common tasks. When activated by a user (e.g., clicked on), a button 102a-102g responds by causing a predetermined application function to occur. For example, button 102c includes a picture of a diskette. When a user clicks on the picture of a diskette 102c or anywhere within a bounding region that defines the button 102c, the word processor saves a document 106.

The toolbar 102 can include controls other than buttons 102a-102g. For example, as shown, the toolbar 102 includes a list control 102h and a pull-down menu control 102i. Referring also to FIG. 2, when activated by a user, the pull-down menu control 102i presents a list 104 of menu choices 104a-104c.

A control can be enabled so as to be responsive to user input or disabled so as to be unresponsive to user input. A control can be displayed differently if disabled. For example, because the user has not selected any document text 106, the button 102f corresponding to a "cut" function is displayed in a muted gray-scale, indicating that the "cut" function is presently unavailable. As shown, although displayed differently, a disabled control (e.g., 102f) nevertheless occupies its normal amount of space on the GUI screen 100.

The toolbar 102 can remain visible while a user performs other actions such as working on the document 106. Additionally, a user can move the toolbar 102 to different regions of a screen 100. Microsoft Word™ also allows a user to tailor the controls included in a toolbar 102 based on personal preference. For example, a user who does not have a printer can remove the print button 102f from the toolbar 102.

SUMMARY

In one general aspect, customizing a user interface includes providing several user profiles from which a user may be associated. Each user profile includes user profile information. The user profile associated with a user to whom a user interface will be provided is accessed, and a user interface is configured for the user based at least in part upon the user profile accessed as being associated with the user. The user interface includes one or more references to content. Access to content is enabled based on user manipulation to the configure user interface.

Implementations may include one or more of the following features. The user profile information may include age or a level of maturity. The level of maturity may include a child maturity level, a young teen maturity level, a mature teen maturity level, and an adult maturity level. The level of maturity may be selected based upon configuration data associated with an identifier of the user. The user profile information may be supplied by a master user. In one implementation, the user is also the master user. The user profile may be stored and/or updated. The user interface may also be updated in response to updating of the user profile.

The user interface may be configured by a host system, and access to content may be enabled by a host system.

In one implementation, the user interface may be configured by populating the user interface with pre-designated references to content based upon the user profile. Access to content may be enabled by blocking access to other than the pre-designated references. Enabling access to content may include customizing a set of user interface controls displayed to the user. Enabling access to content may also include customizing a pointer associated with a user interface control. In one implementation, the appearance of the user interface control is not changed. A user interface control of a first user may be converted into a user interface control of a second user, where the first user is associated with a first user profile and the second user is associated with a second user profile.

The user interface may be automatically configured, and may be configured in response to a user action. In one implementation, the user interface may be configured in anticipation of user navigation to the user interface. In another implementation, the user interface may be configured in response to user navigation to the user interface.

In another general aspect, several attribute types are provided from which a user may be associated. An attribute type associated with a user to whom a user interface will be provided is accessed. A first user interface is rendered, where the first user interface is available for display to a first user having a first attribute type accessed as being associated with the first user. A second user interface is rendered, where the second user interface is available for display to a second user having a second attribute type accessed as being associated with the second user.

Implementations may include one or more of the following features. The attribute type may be indicative of an age or maturity level. For example, the first attribute type may be indicative of an adult maturity level and the second attribute type may be indicative of a child maturity level. The child maturity level may include a mature teen, a teen, and a pre-teen.

In another general aspect, several user characteristics from which a user may be associated are provided. A user characteristic associated with a user to whom a user interface will be provided is accessed. A user interface is provided based at least in part upon the user characteristic accessed as being associated with the user, where the user interface includes at least one control. Access to information or services is provided based on the user characteristic.

Implementations may include one or more of the following features. The user characteristic may include age or a level of maturity.

In another general aspect, regulating user interface controls includes identifying a grouping from among multiple groupings and providing a set of user interface controls corresponding to the identified grouping.

Implementations may include one or more of the following features. The set of user interface controls may be displayed as a bank of controls. The controls can include buttons, pull-down menu controls, and other user interface controls. The user interface controls can be provided by changing an existing collection of user interface controls (e.g., adding or removing user interface controls in a default set of controls).

The groupings may be based on user maturity. For example, different groupings may be for children and/or teenagers. The groupings may also be used to identify access levels to network service provider services such as e-mail, chat rooms, and Internet browsing.

Identifying a grouping may include receiving user information and determining the grouping based on the received information. Such user information may be received through a network connection. The information may include a user identifier. The user identifier may be associated with a grouping by storing the associated grouping in a database. The grouping can be selected from a list or by identifying user characteristics such as a user's age.

In another general aspect, producing a toolbar having user interface controls includes associating a grouping corresponding to a maturity level with a user identifier by receiving multiple groupings, receiving a user identifier over a network connection, determining the grouping associated with the user identifier, and using the determined grouping to produce a toolbar having user interface controls. The user interface controls included in the toolbar are determined based on the grouping associated with the user identifier.

In yet another general aspect, a user interface is customized by accessing user profile information for a user of a computer system, configuring a user interface control, including one or more references to content, based at least in part upon the user profile information, and regulating access to content based on the user profile information. Implementations may include one or more of the following features. The user profile information may include age, or a level of maturity. The user interface control may be configured automatically or in response to a user. Access to content may be enabled by blocking access to information other than the pre-designated references. The user interface control may be populated with pre-designated references to content based upon the user profile information. User profile information may be supplied, for example, by a master user. The user profile information may be stored and/or updated. Also, the user interface control may be updated, for example, when the user profile information is updated.

Advantages may include one or more of the following. For example, by customizing the controls made available by a toolbar based on a user's group, different users can enjoy the benefits of a toolbar without the clutter of permanently disabled controls or controls not frequently accessed. When the groups correspond to different levels of maturity, an application can provide youngsters with a toolbar that limits access to certain functions, for example, by omitting buttons relating to forbidden functions, without calling these limitations to a child's attention. Additionally, a simplified toolbar—for example, a toolbar that includes buttons different than those available on a full-access toolbar—can direct a child's attention to age-appropriate features that a child is likely to enjoy.

When a network service provider furnishes group specific toolbars, adults can place a child in front of a networked computer without worrying that the child will stumble onto material intended for mature audiences. At the same time, the child is not frustrated or confused by interacting with a toolbar featuring a number of disabled controls.

The details of one or more implementations are set forth in the accompanying drawings and the description below. Other features and advantages will be apparent from the description and drawings, and from the claims.

DESCRIPTION OF DRAWINGS

FIGS. 5A and 5B are screenshots of toolbars that have different controls based on the different access-levels of different users.

Like reference numbers and designations in the various drawings indicate like elements.

DETAILED DESCRIPTION

Figure 1:
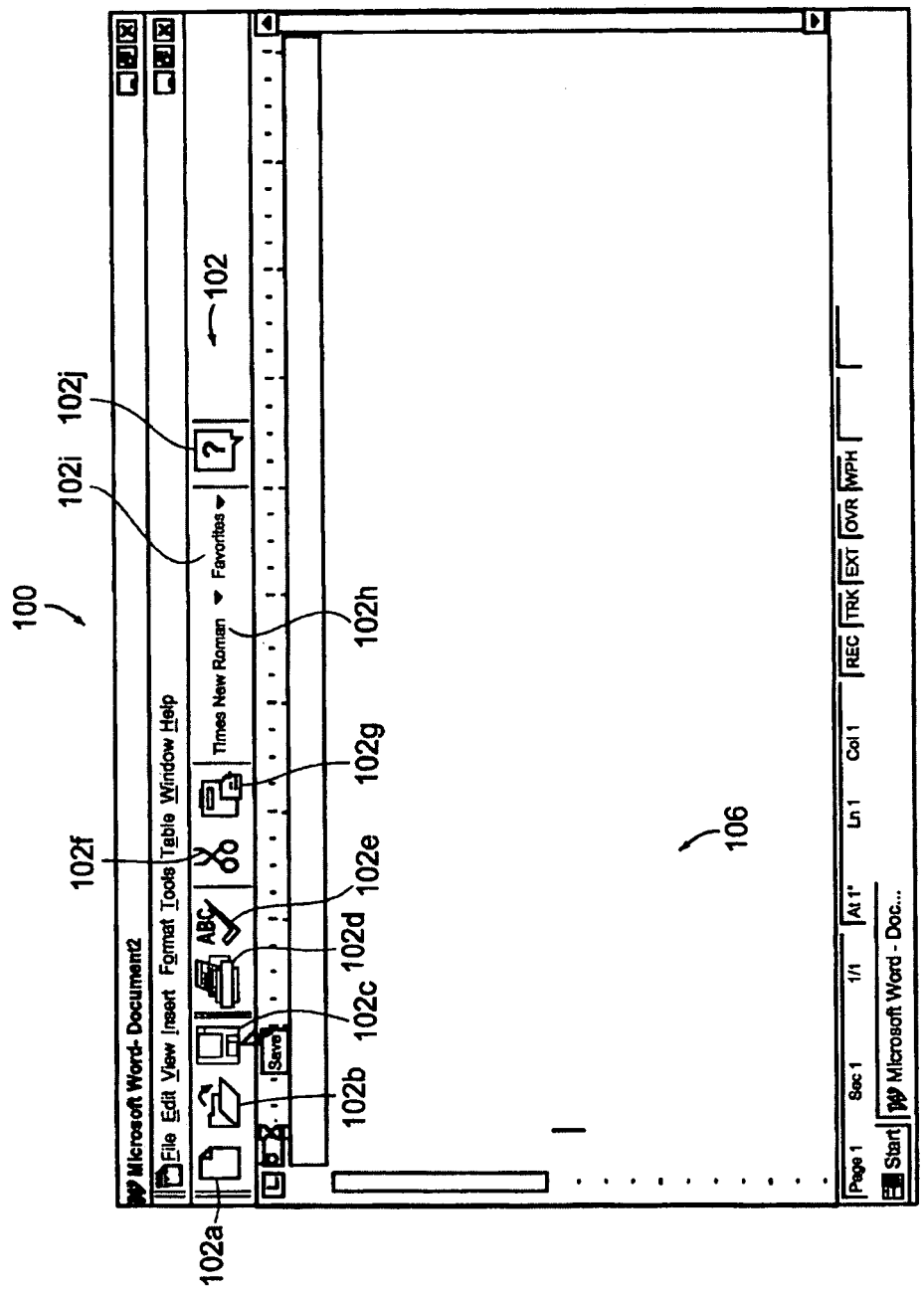
FIGS. 1 and 2 are screenshots of a graphical user interface (GUI).
Figure 2:
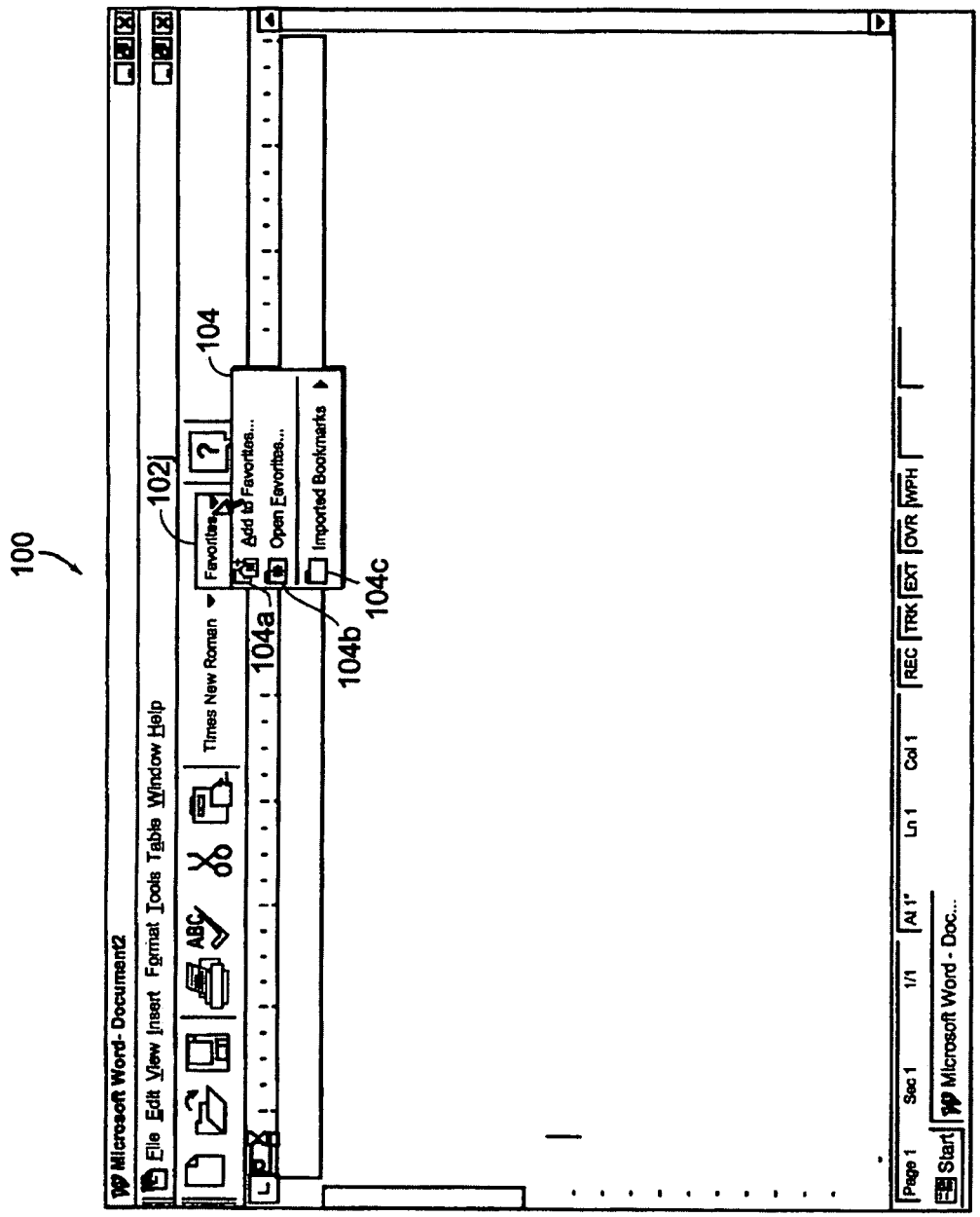
Figure 3:
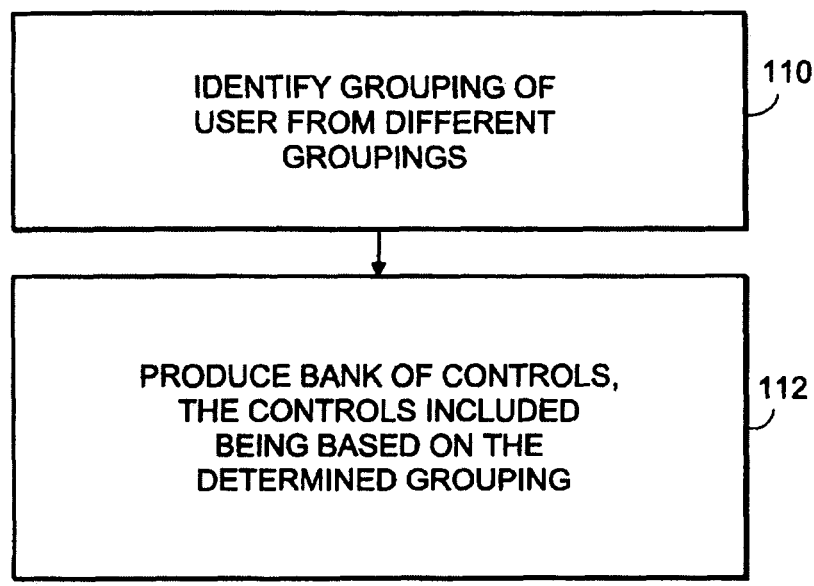
FIG. 3 is a flow chart of a procedure for producing a bank of controls based on an identified access level.

Referring to FIG. 3, producing a bank of user interface controls for a graphical user interface (GUI) includes identifying a user's grouping (110) from a set of different groupings and including controls in the bank of controls (112) based on the identified grouping. Identifying a grouping (110) can be achieved based on any combination of a number of factors. For example, a grouping can be determined based on information describing user characteristics (e.g., age) or by using environmental information (e.g., when an application is launched). The grouping, or user profile information, may include a user-defined grouping or a pre-defined grouping which the user may opt to join or to which the user may be associated without input from the user. In one implementation, the user may be associated with more than one grouping.

This technique of producing a bank of user interface controls provides a user with a concentrated collection of controls tailored to a user's grouping. Thus, users belonging to a group having restricted-access do not experience the problem of toolbar clutter that results from permanently disabled controls reserved for more privileged users. Additionally, functions that a certain class of user (e.g., child, elderly, mentally challenged) are likely to use more frequently can be presented more conspicuously (e.g., as a toolbar button instead of as a menu choice). In one implementation, the user is assigned to a class by, for example, a master user. In another implementation, the user self-selects a class from among several available classes. For instance, the user may choose to belong to a "teen" class of user rather than a "child" or "adult" class of user. In yet another implementation, the user may be assigned to or may choose to belong to more than one class. For example, the user may choose to be assigned to a "teen" class and a "sports fan" class, and a user interface would then be configured as appropriate to a teen sports fan user.

The technique described above has a wide variety of potential applications. For example, network services such as e-mail and Internet access offer adults a wealth of information and communication options. These services, however, can expose teenagers and children to subject matter aimed at more mature audiences. Some inappropriate material is actively sought by young users (e.g., via the Internet) while other material is inappropriately sent to young users (e.g., in chat rooms). Accordingly, one implementation employs maturity-based groupings to customize different toolbars for network service users of different ages.

Figure 4A:
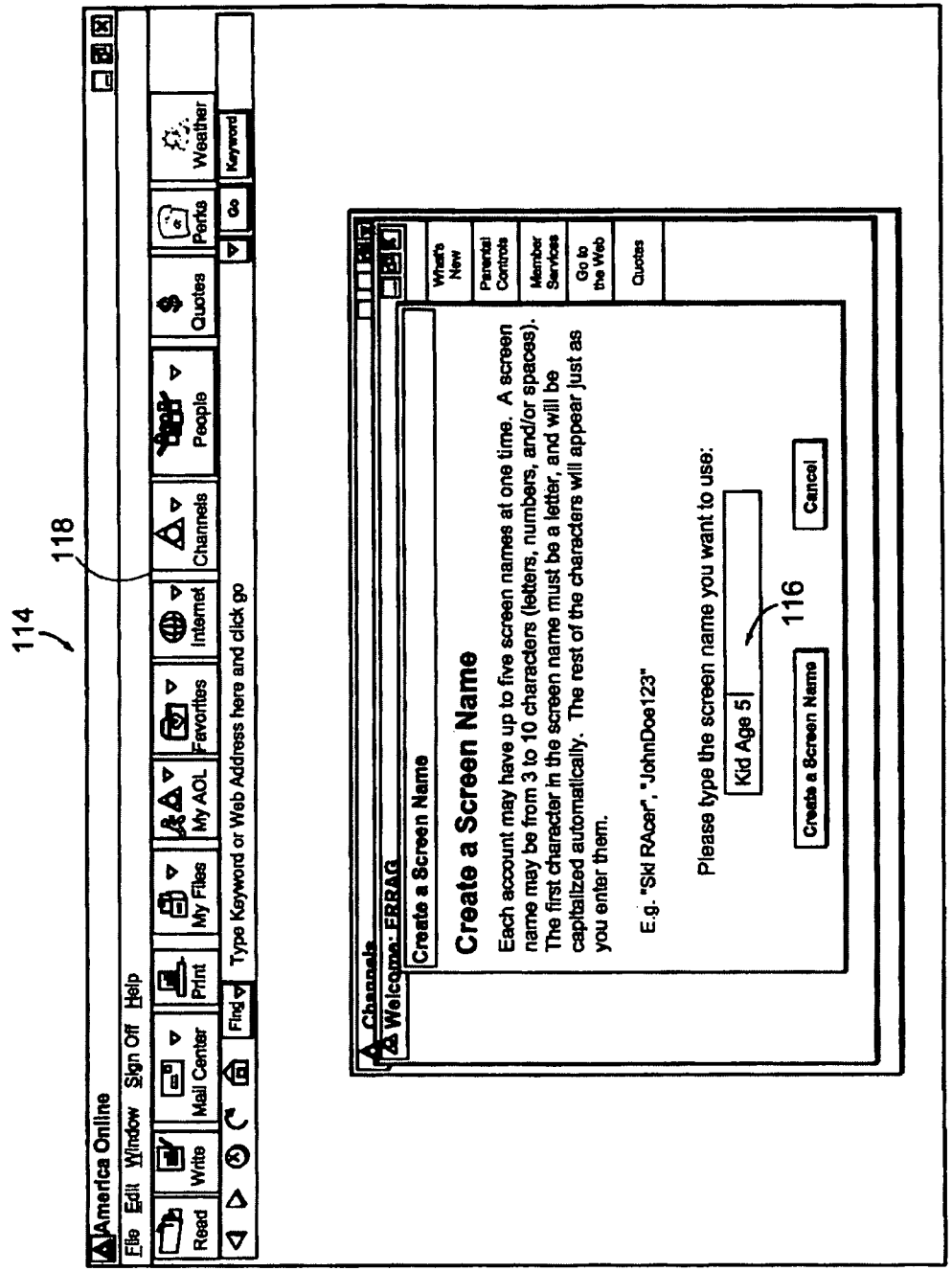
FIGS. 4A and 4B are screenshots of a GUI that can define an access level for a user.

Referring to FIG. 4A, a network service provider GUI 114 can include one or more toolbars 118. Tailoring a toolbar 118 to include a specific set of controls for users of different ages can help protect teenagers and younger children from inappropriate material and simplify use by eliminating otherwise disabled functions from representation on a GUI screen 114. This tailoring also can steer younger users toward areas of potential interest.

Figure 4B:
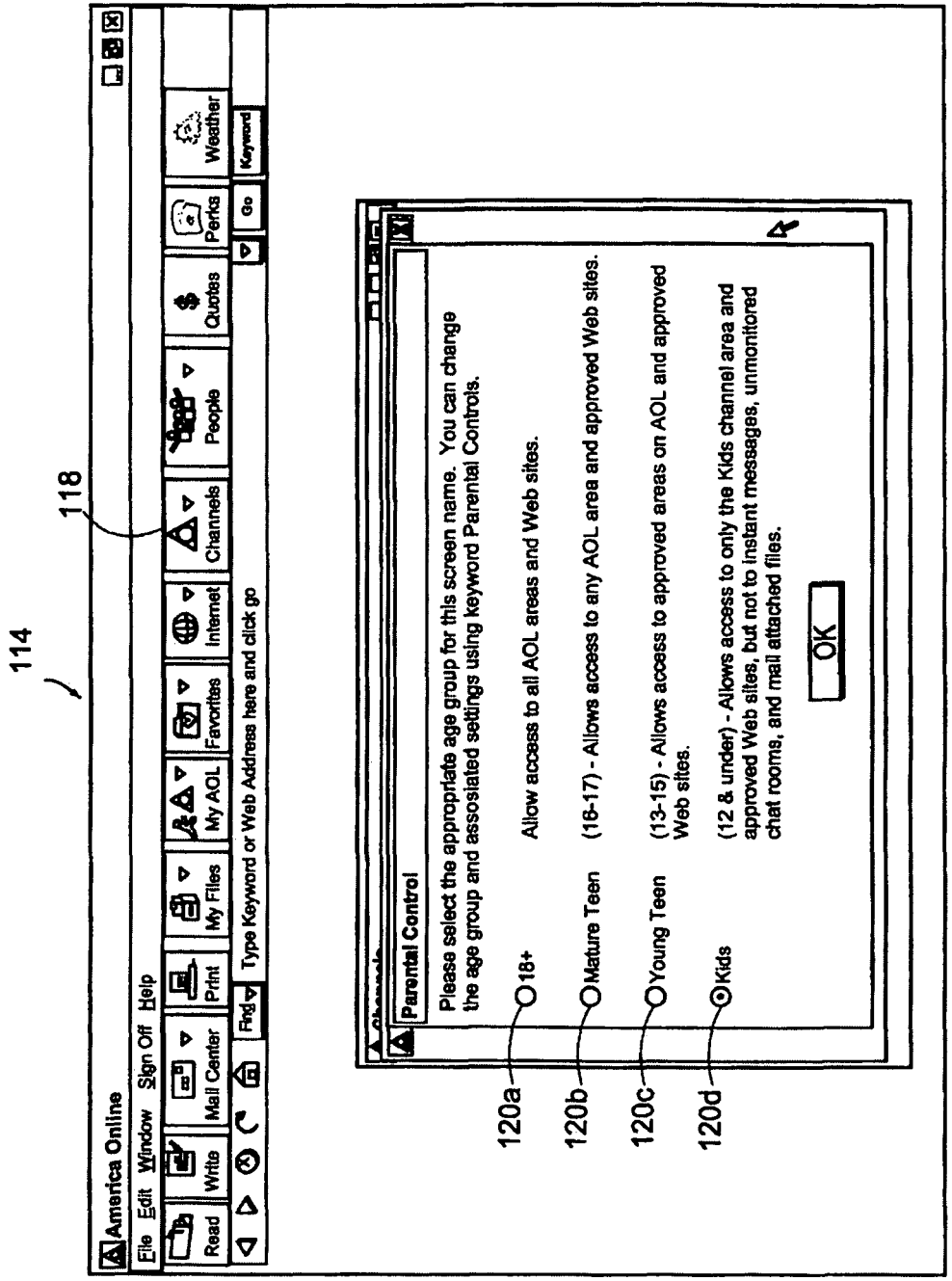

In one implementation, a user's grouping is defined by a "master" user such as an adult having an account with a network service provider, or a system administrator of the network service provider. The master user may select the user's grouping from among a set of available groupings, the master user may modify or otherwise customize an available grouping, or the master user may create a new grouping to associate with the user. As shown, an adult can create an account for a child by selecting a screen name (i.e., a user identifier) 116. Referring to FIG. 4B, the adult then can select a grouping (e.g., 18+ 120a, mature teen 120b, young teen 120c, or kids 120d) from a list of available groupings to associate the selected grouping with the user identifier. Different groupings also grant different levels of access to the Internet (e.g., browsing, newsgroups, FTP (file transfer protocol) downloads), e-mail, chat sessions, and other network services (e.g., account management). Network service software on a client or a host can use a selected grouping (e.g., as defined by a master user) to provide a toolbar tailored to services available to the users of the selected grouping. Selecting a grouping from a list of available groupings enables an adult to quickly set up accounts for different youngsters that both provide appropriate limitations on access and provide a customized user interface. The groupings shown are merely illustrative. For example, in another implementation, the network service software includes only two groupings: "Internet access" and "no Internet access." In another implementation, the user may self-select from the list of available groupings, modify an existing grouping, or may create a new grouping.

Referring to FIGS. 5A-5D, a toolbar 118 produced for a user identified as having an "18+" grouping (i.e., an adult or general access user) includes controls different from a toolbar 124 produced for a user identified as belonging to a "kids" group. As shown, both toolbars 118, 124 share a number of common controls such as controls for handling e-mail 118a-118c, 124a-124c. Additionally, both toolbars 118, 124 share general characteristics. For example, buttons 118a, 118b, 118k-118m and pull-down menus 118c, 118e-118j both include pictures (e.g., a printer) and text (e.g., "Print") describing the function(s) accessible with a control. A user can reduce the amount of screen space that a toolbar 118, 124 occupies by configuring the toolbar 118, 124 to only display the text description (not shown).

Figures 1, 5A:
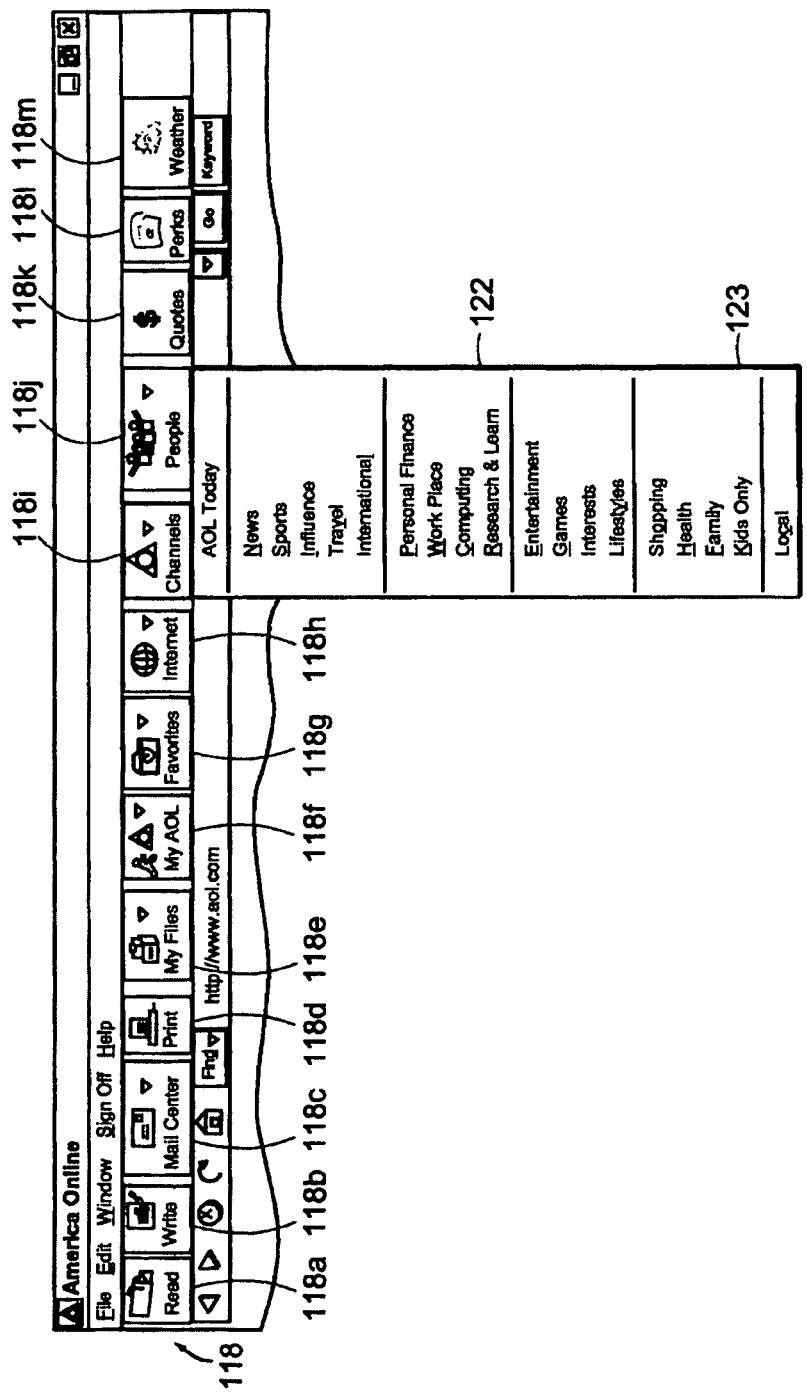
Figures 2, 5A:
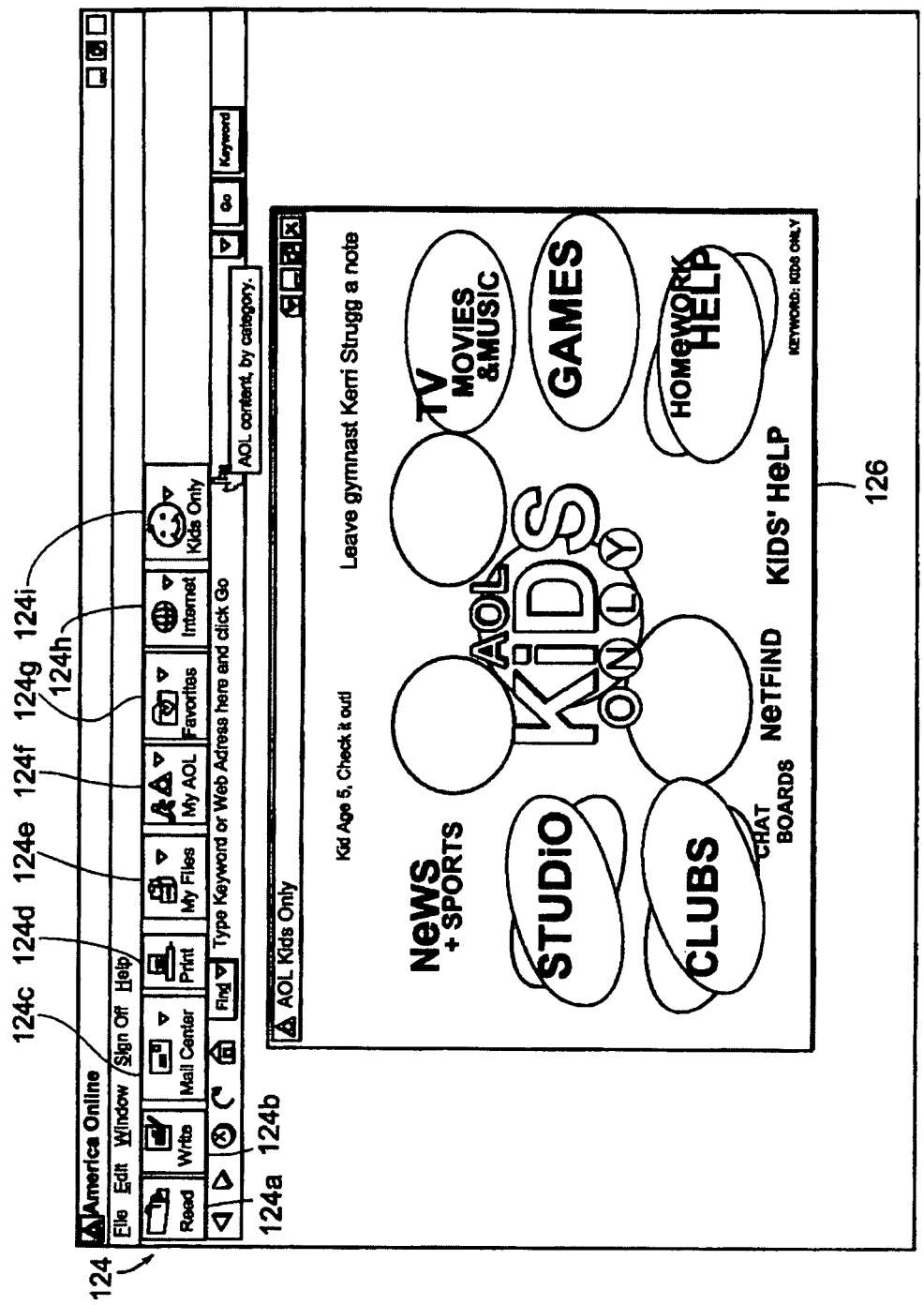

As shown in FIG. 5A, adult toolbar 118 includes a pull-down menu control 118i labeled "Channels" that lists menu choices 122 corresponding to different categories of information that a user can access. Some of the information included in these categories may be inappropriate for young children (e.g., magazine subscriptions that can be ordered using a "bill me later" option). As shown, the "Channels" pull-down menu 122 features a "Kids Only" menu choice 123 near the end of the listed choices 122.

The kids toolbar 124 does not include a number of controls 118j-118m included in the adult toolbar 118 (e.g., controls for accessing stock quote information and for making purchases). Additionally, the kids toolbar 124 does not include the "Channels" menu control 118i included in the adult toolbar 118. The kids toolbar 124 instead includes a "Kids Only" button 124i that presents a "Kids Only" window 126 when activated. Providing access to the "Kids Only" window 126 as a prominent button 124i in the kids toolbar 124, instead of being buried in a list of choices provided by a pull-down menu control 118i, increases the likelihood a young child will navigate to the window 126. Thus, a menu choice available to an adult may be converted into a control button for a child's easy access.

Referring to FIG. 5B, the adult toolbar 118 also includes a "Favorites" pull-down menu control 118g that contains references to content frequently accessed by an adult. Many of the listed entries, for example, merchandise available for purchase on-line or bookmarked Internet sites, may be inappropriate for children. The kid's toolbar 124 does not include the "Favorites" pull-down menu control 118g, but instead offers a "Shortcuts" pull-down menu control 124g that lists choices that direct a child to areas of special interest to kids (e.g., school project ideas).

Figure 6:
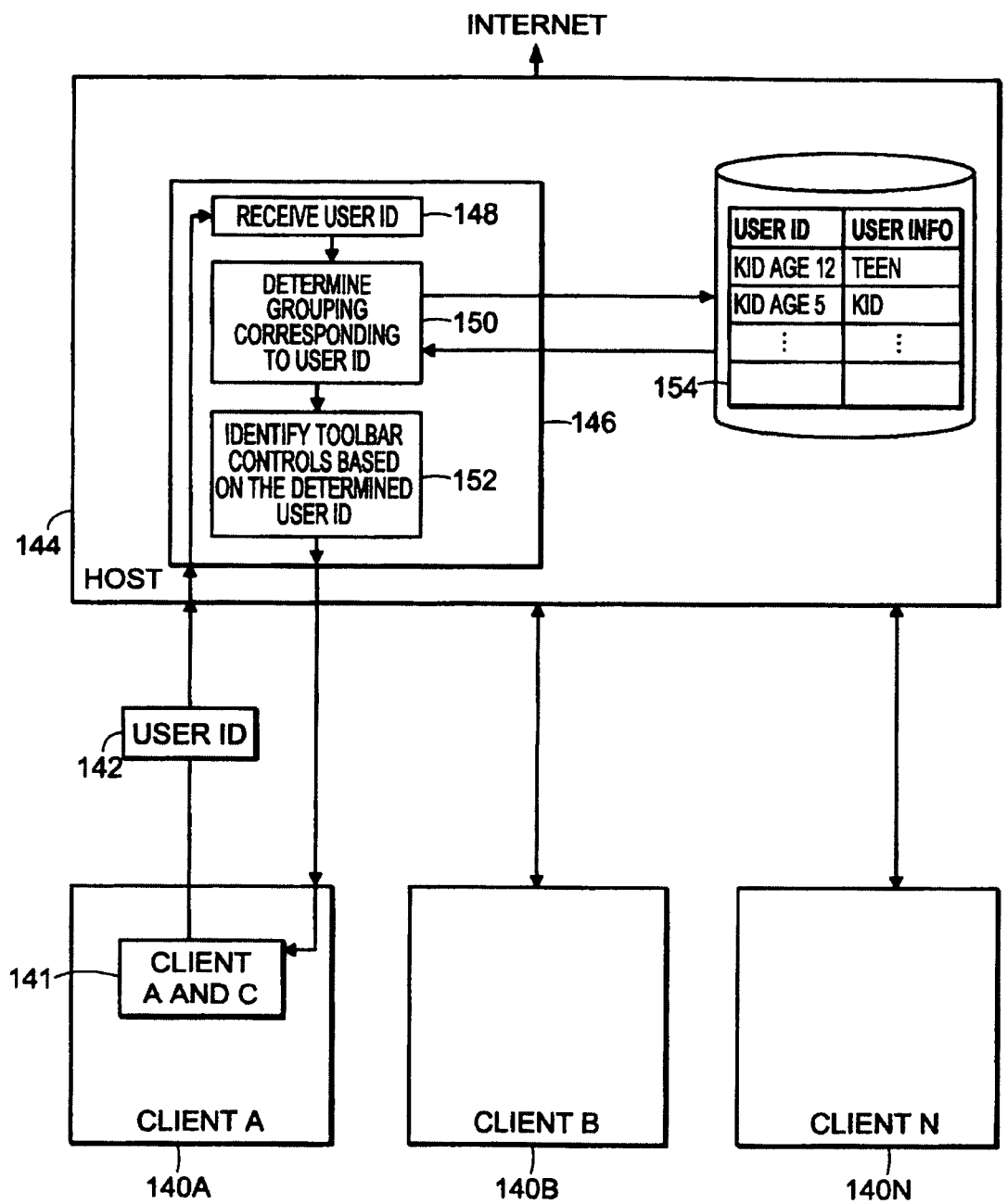
FIG. 6 is a diagram of a system for producing a bank of controls based on an identified access level.

Referring to FIG. 6, in one implementation, a host 144 uses a table 154 to store the grouping assigned to a user identifier (ID). It should be understood that the host 144 may not be a single computer, but a collection of networked computers. A client, such as client 140a, executing client software 141 (e.g., America Online client software) initializes a network session by sending a message including a user identifier 142 to the host 144. The message may also include other information such as the client 140a platform (e.g., a PC or Macintosh computer). Software instructions 146 executing on the host 144 use the table 154 to determine the grouping corresponding to the received user ID 142 (150) and identify an associated set of toolbar controls based on the determined access level (152). The host 144 can transmit the toolbar information to the client 140a, which will use the information to display a toolbar having the designated set of toolbar controls.

The host software 146 can prepare toolbar information in a number of ways. For example, the software 146 may begin with a default set of controls (e.g., the controls included in the adult toolbar) and modify the controls included in the toolbar transmitted to the client 140a by eliminating and/or adding controls to the default set. The default set of controls can reside on either the client 140a or the host 144. The controls may be prepared at any time, including preparing the controls in anticipation of user navigation to the user interface or in response to user navigation to the user interface.

The software 146 can also modify a control in the default set of controls to produce a different control. For example, the software 146 can produce a different pull-down menu control by removing or adding menu choices from an existing pull-down menu control. Additionally, a new button can be produced by modifying an existing button to have a different picture, descriptive text, and/or preprogrammed function. In another implementation, controls may be modified without modification of the user interface. For example, a pointer or a link associated with a control may be modified without modification of the appearance of the control itself. As a further example, a control that contains a pointer or a link to content suitable for an adult may be changed to a pointer or a link to content suitable for a child, without affecting the appearance of the control. Thus, a child user will be able to navigate to age appropriate content even though the user interface appears the same as a user interface configured for an adult user.

The system shown in FIG. 6 is merely illustrative. A wide number of different systems can also produce a toolbar customized for different groupings. For example, user information (e.g., user ID and grouping) can be stored on the client 140*a* instead of the host 144. This configuration, while potentially faster than the system shown in FIG. 6, may run a risk that a clever youngster may figure out how to alter user information stored at the client and thereby obtain access to network services that may be inappropriate. In contrast, storing toolbar customization information at the host helps prevent against the unauthorized viewing of or access to the customization information. Other implementations distribute system functions between the host 144 and clients 140*a*-140*n* differently. Further, in some implementations, the entire system resides on a single computer instead of a host 144 and client 140*a*.

Figure 7:
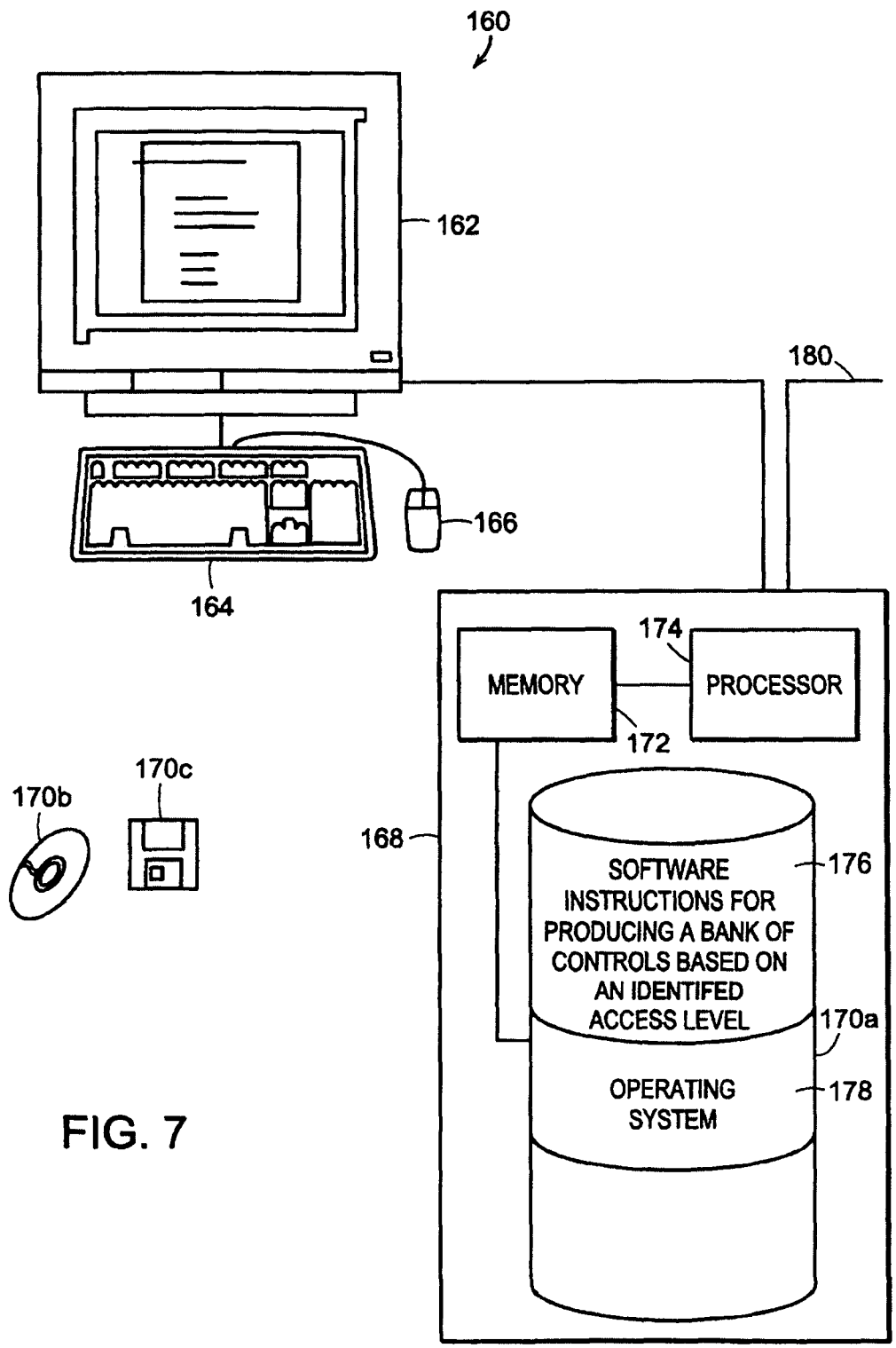
FIG. 7 is a diagram of a computer platform.

Referring to FIG. 7, a computer platform 160 suitable for executing instructions for producing a bank of controls based on an identified access level 176 includes a display 162, a keyboard 164, a pointing device 166 such as a mouse, and a digital computer 168. The digital computer 168 includes memory 172, a processor 174, a mass storage device 170*a*, and other customary components such as a memory bus and peripheral bus (not shown). The platform 160 may further include a network connection 180.

Mass storage device 170*a* can store the instructions 176 for producing a bank of controls and instructions for an operating system 178 (e.g., Microsoft Windows 98™). The instructions 176 may be transferred to memory 172 and processor 174 in the course of operation. The instructions cause the display 162 to display images of a graphical user interface. The instructions 176 can be stored on a variety of mass storage devices such as a floppy disk 170*b*, CD-ROM 170*c*, or PROM (not shown).

In one implementation, a "Favorite Places" menu control may be modified based on user profile information to contain links to content appropriate or interesting to the user. The modification may be made at any time, including during installation of client software, before execution of client software, during execution of client software, or after execution of client software. The modification may be made automatically, or in response to an action by a master user or by the user. For example, the modification may be made in anticipation of user navigation to the user interface, or in response to user navigation to the user interface. Also, the modification may include populating the "Favorite Places" menu control with predetermined links based upon the user profile information.

The user profile information may include information that is useful in configuring a user interface for the user, and may include information such as the age or maturity level of the user. The user profile information may be input or modified by a master user, and may be, for example, supplied during account setup for the user. In another implementation, the user provides or modifies the user profile information. In yet another implementation, a set of pre-defined user profiles may be made available, and one or more profile may be associated with the user. For example, a master user may select a profile from among the available profiles to associate with the user, or the user may self-select a profile.

For example, in one implementation, a parent or other adult may act as a master user to set up an account for a child user. During the account setup, the master user may supply user profile information for the child user that indicates that the child user is a child of a certain age or age group. For example, the master user may supply user profile information indicating that the child user is a child of age 12 and under. A "Favorite Places" menu control may be prepared based upon the user profile information indicating that the user is a child. For instance, when the user profile information indicates that the user is a child, a "Favorite Places" menu control may be prepared using pre-designated, age appropriate, links to populate the menu control. In another implementation, the user self-selects user profile information indicating, for example, that the user is a child of age 12 and under. The menu control may be populated at any time, including in anticipation of user navigation to the menu control or in response to user navigation to the menu control. A parental controls feature may be used to limit the default "Favorite Places" links to content used to populate the menu control. Also, in one implementation, the child user may be blocked from adding links other than those on the pre-designated list. The "Favorite Places" menu control may be updated periodically by, for example, updating the links on the pre-designated list. The menu control may be updated at any time, including in anticipation of user navigation to the menu control or in response to user navigation to the menu control.

Figure 8:
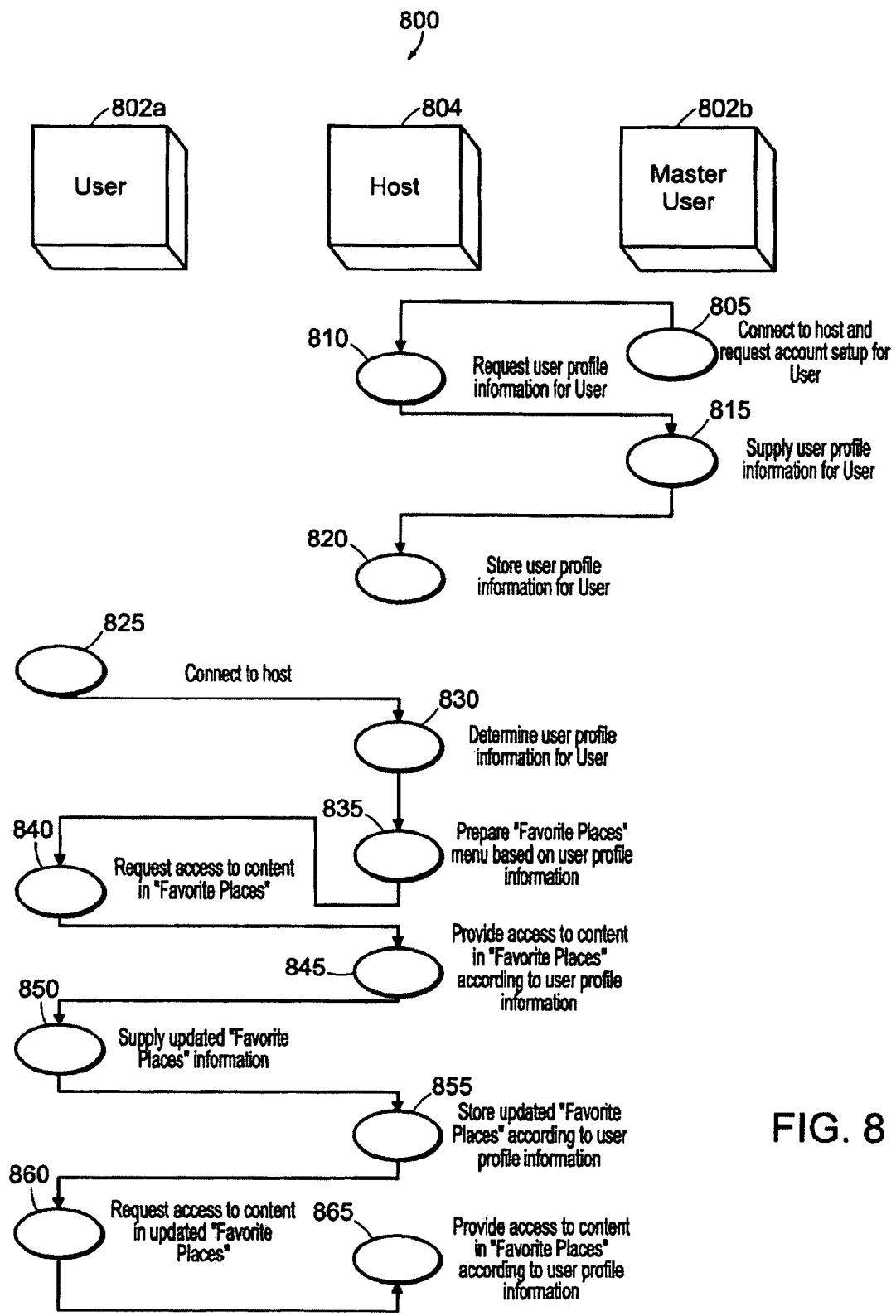
FIG. 8 is a flow chart of a procedure for customizing a user interface.

Referring to FIG. 8, a user 802*a*, a master user 802*b*, and a host 804 interact according to a procedure 800 to customize a user interface. The procedure 800 may be implemented by any type of hardware, software, device, computer, computer system, equipment, component, program, application, code, storage medium, or propagated signal. In one implementation, the master user 802*b* is separate from the user 802*a*. In another implementation, the master user 802*b* is also the user 802*a*.

Examples of elements shown in FIG. 8 (e.g., user 802*a*, master user 802*b*, and host 804) are broadly described above with respect to FIGS. 6 and 7. In particular, the user 802*a* and the master user 802*b* typically have attributes comparable to those described with respect to client devices 140*a*, 140*b*, and 140*n* and/or computer platform 160. The host 804 typically has attributes comparable to those described above with respect to host device 144. Furthermore, although not shown in FIG. 8, the user 802*a*, the master user 802*b*, and/or the host 804 may be directly or indirectly interconnected through known or described delivery networks, examples of which are described with respect to network connection 180.

The procedure 800 generally involves customizing a user interface based upon user profile information. Examples of user profile information include the age or maturity level of the user. In one implementation, a set of pre-defined user profiles is made available, and one or more profiles is associated with the user. In another implementation, a user profile is modified or created to be associated with the user. The user profile information may be unique to the user, or may be common to several users of the computer system. The user interface customized according to the user profile information may contain one or more references to content, such as, for example, a collection of favorite links to frequently accessed content.

By regulating the references to content based on user profile information, age-appropriate control is maintained over the content viewed by the user. Generally, control is maintained through a master user, such as a parent or other adult, who is able to supply user profile information for the user in order to appropriately tailor the links to content offered to the user in a "Favorite Places" menu control. The master user may select from among one or more pre-defined user profiles to associate with the user, or may modify or create a profile to associate with the user. Thus, flexibility is maintained by age-appropriate tailoring of links to content that may appear in the "Favorite Places" menu control.

In procedure 800, the master user 802b and the host 804 are physically and/or logically connected. For instance, master user 802b may connect to the host 804 across a network (e.g., network connection 180) by supplying a user identification and password to a server of the host 144. In general, the master user 802b is a customer serviced by the host 804 and typically is a parent or other adult.

The master user 802b may send a request to the host 804 to establish or modify an account for a user 802a (step 805). The host 804 responds to the request from the master user 802b by requesting user profile information from the master user 802b (step 810). User profile information may include, for example, information relating to the age and maturity level of the user, such as an age in years or an age category (e.g., child of age 12 and under ("Kids Only"), young teen between 13-15, mature teen between 16-17, and adult of 18 years and older). The user profile information may correspond to information used in a parental controls feature to regulate the ability of a user 802a to access content. User profile information also may include other attributes assigned to the user, such as, for example, personal information such as hobbies, interests, name and/or address.

Requesting user profile information may include presenting a user interface ("UI") to the master user 802b. The UI may be presented as a Web page having text, images, audio, video, and/or any other type of content. In one implementation, shown in FIG. 4B, a UI 114 includes user profile information about the user 802a, one example of which is the user's age group 120a, 120b, 120c, 120d. As shown in FIG. 4A, a UI 114 may include a screen name 116 provided by a master user 802b during the process of setting up an account for a user 802a.

The master user 802b supplies user profile information to the host 804 (step 815). Supplying user profile information may include having a client system 140a connect across a network 180 and supply user profile information to a host system 144.

The host 804 stores the user profile information for the user (step 820). The host 804 may store the user profile information in, for example, a database 154 on the host, a memory 172 or mass storage device 170a on the client 160, 140a, or on another suitable storage medium and/or location.

At some later time, the user 802a connects to the host 804 (step 825). For instance, the user 802a may connect to the host 804 across a network (e.g., network connection 180) by supplying a user identification and password to a server of the host 144. In general, the user 802a is a customer serviced by the host 804 and typically is a child or otherwise under the supervision of the master user 802b.

The host 804 determines the user profile information of the user 802a (step 830). Determining the user profile information may include retrieving the user profile information of the user 802a from a storage location on the host 144 or on the client 140a. For example, the user profile information may be retrieved from a database 154 on the host, a memory 172 or mass storage device 170a on the client 160, 140a, or another suitable storage medium and/or location. Alternatively, determining the user profile may include extrapolating information from user activities. For example, user profile information may be extrapolated based upon content or services frequently accessed or requested by the user. In one instance, a user profile may be modified to note an interest in sports based upon frequent user viewing of sports related content. The profile may be further customized based upon, for example, the user's viewing of baseball related content compared to the less frequent viewing of hockey related content.

Figure 9A:
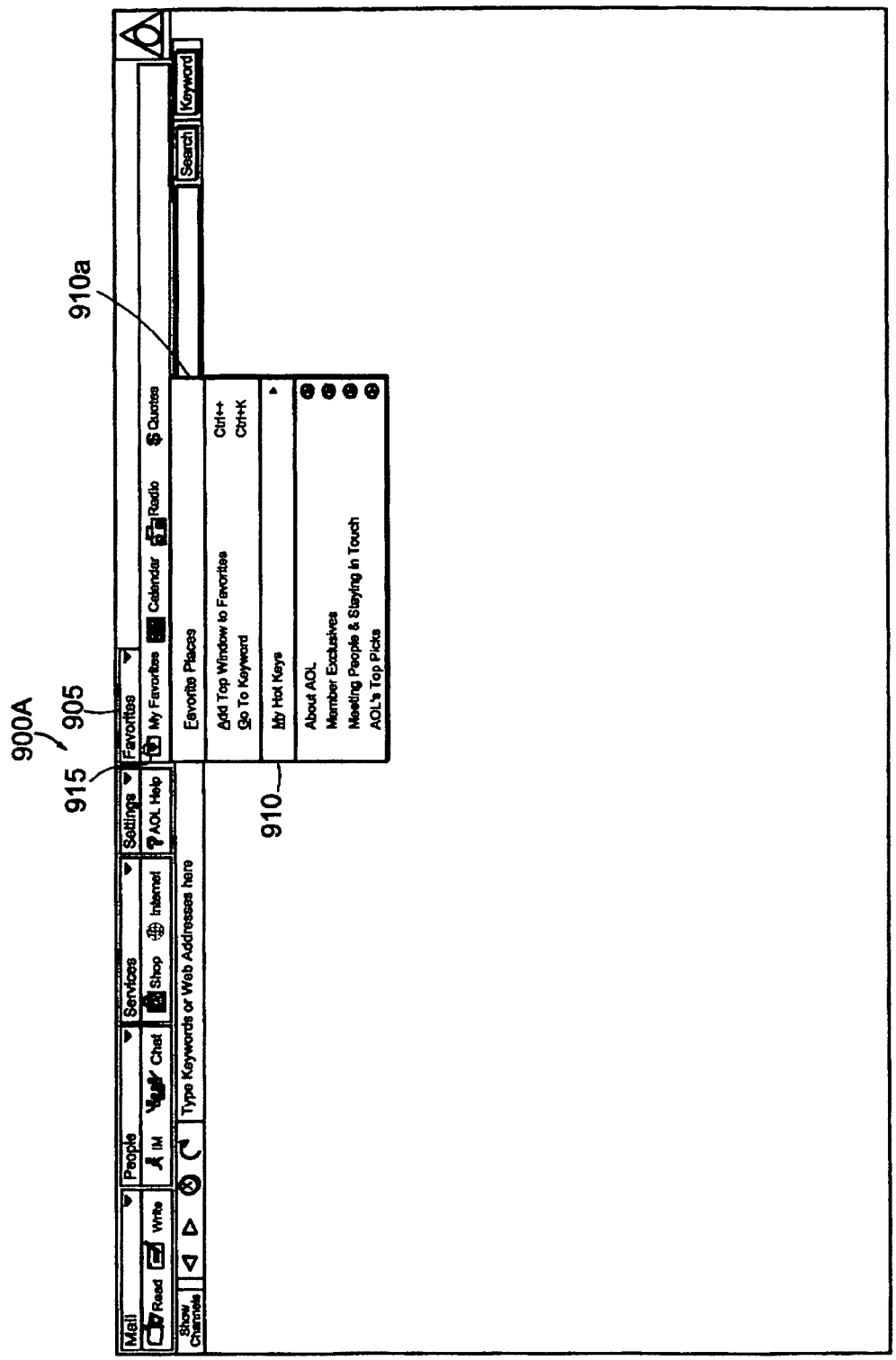
FIGS. 9A, 9B, 10A, 10B, and 11-12 are screenshots of UIs that may be used in the procedure of FIG. 8.
Figure 9B:
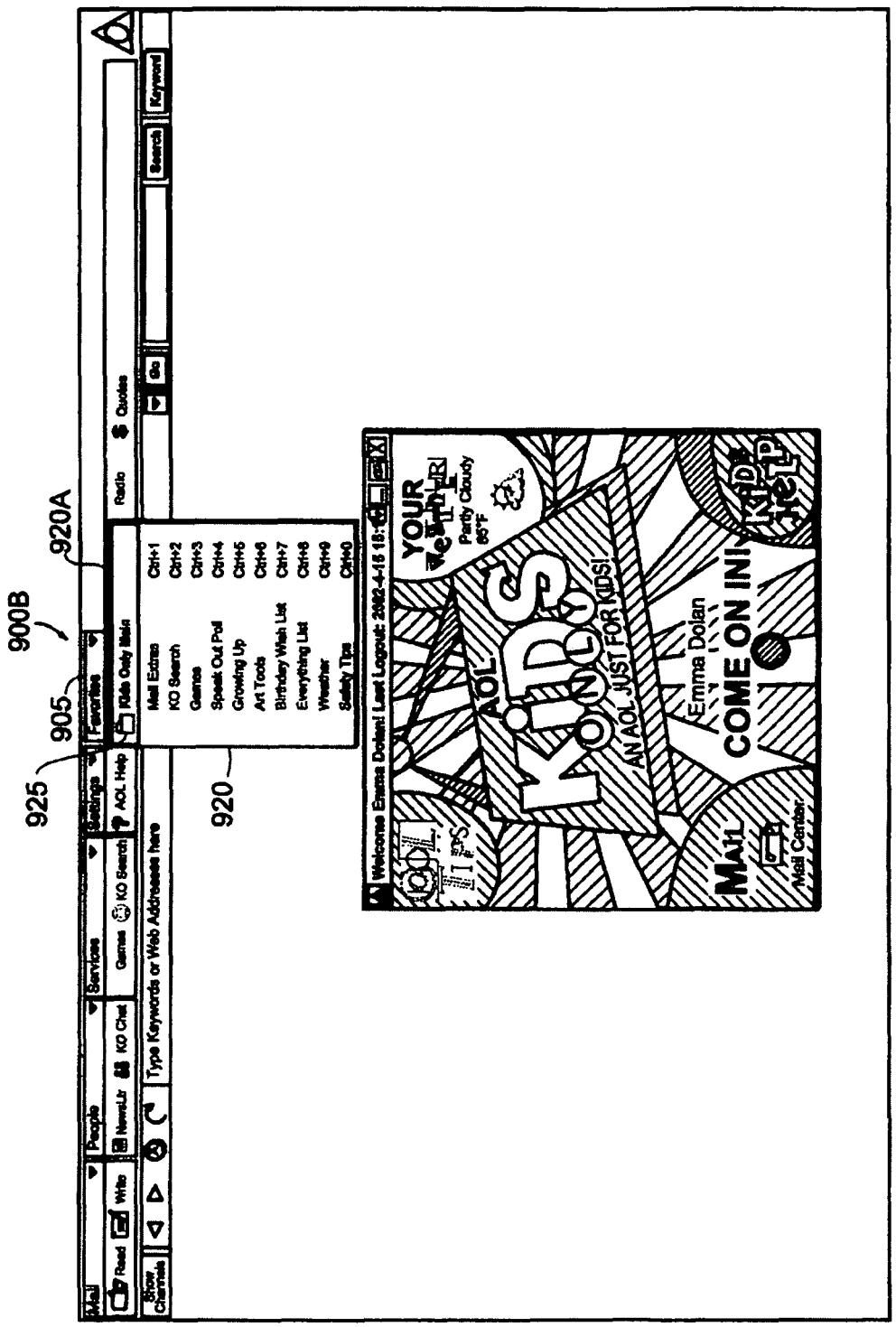
Figure 10A:
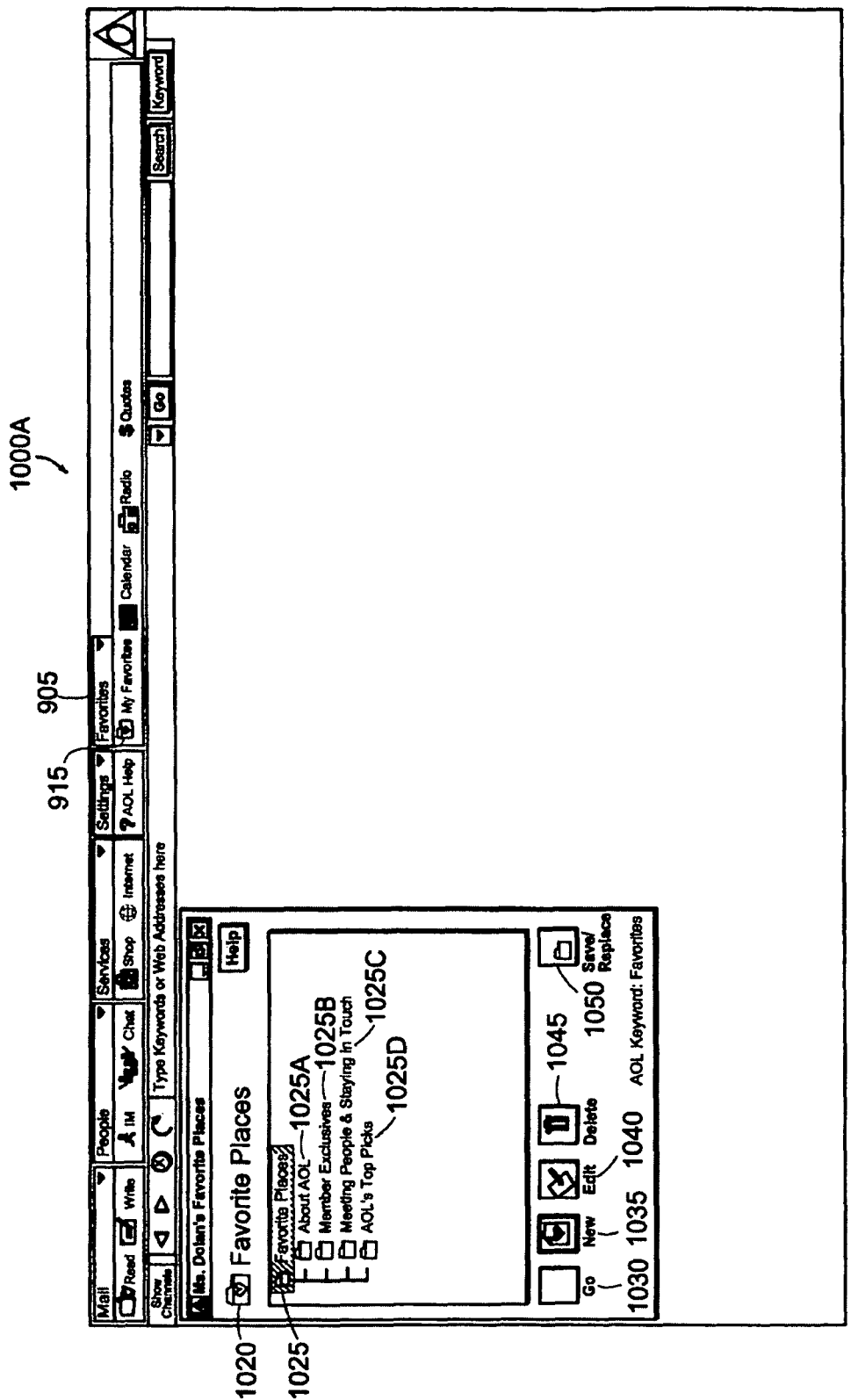
Figure 10B:
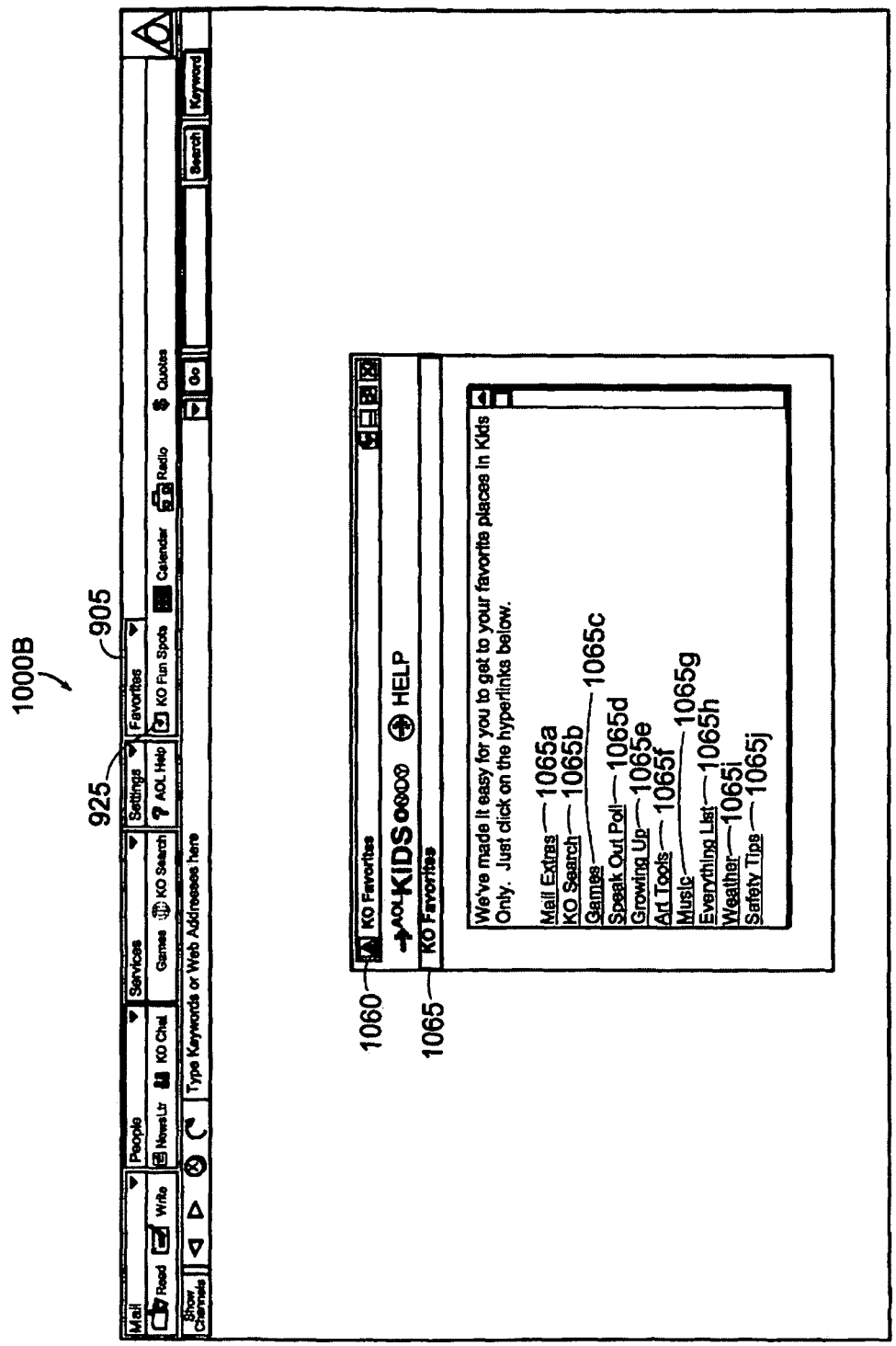
Figure 11:
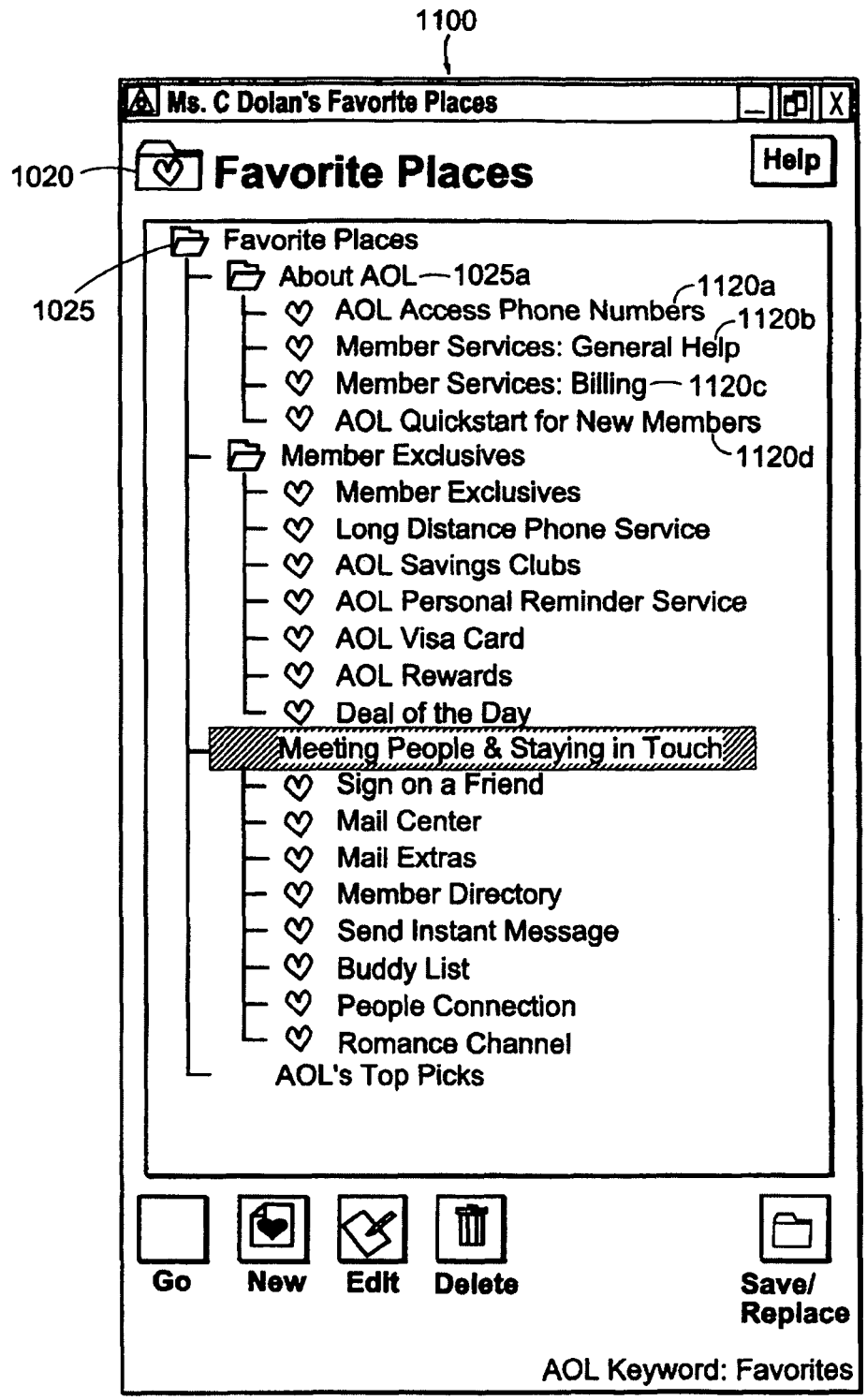

The host 704 prepares a customized user interface control based on the user profile information (step 835). For example, the customized user interface includes a "Favorite Places" menu control that contains one or more links to content customized based on the user profile information. In this example, the customized user interface may be prepared by populating a "Favorite Places" menu control with pre-selected links to content that the user would be interested in viewing e.g., those which are age-appropriate for the user 802a based upon the given user profile information. For example, if the user 802a is an adult, the "Favorite Places" menu control may be populated with one or more links to content that would be of interest to and appropriate for an adult. Further, the user may be permitted to further customize the links to content by adding or deleting one or more links. FIGS. 9A, 10A, and 11 show an implementation of a user interface customized for an adult. If, on the other hand, the user 802a is a child of age 12 or under, or has been somehow identified or designated as a child of age 12 or under, or has been associated with an age 12 or under account, the "Favorite Places" menu control may be populated with one or more pre-designated links to content that would be of interest to and appropriate for a child of that age group. FIGS. 9B and 10B show an implementation of a user interface customized for a child of age 12 or under, and are analogous to FIGS. 9A and 10A.

In one implementation, shown in FIG. 9A, a UI 900A for an adult user includes a menu control dropdown button 905 labeled "Favorites" that, when selected, renders a dropdown menu 910 that includes a menu item labeled "Favorite Places" 910a. To display the "Favorite Places" menu control, the user 802a clicks on the menu item 910a or simultaneously presses the ALT key and the underlined letter in the icon. Also, a menu button 915 labeled "My Favorites" is available as a shortcut to the menu item 910a. When the adult user selects menu item 910a or selects menu button 915, a UI 1000A may be prepared and rendered.

As shown in FIG. 10A, a customized UI 1000A for an adult user may be prepared by populating a designated area 1020 of the UI 1000A with a listing of links to content that are chosen automatically based upon the user profile information associated with the user. For example, links to a user's "Favorite Places" 1025 may be prepared. One or more of the links to content may be shown as, for example, a link to a folder (for example, folders 1025a, 1025b, 1025c, 1025d), where the folder contains links to content. Also, one or more of the links to content 1120 may also be shown as a direct link to the content (for example, see link 1120 shown in FIG. 12). The adult user may be given an option to go directly to the linked content using a button 1030, to create a new link to content 1035, to edit a link to content 1040, to delete a link to content 1045, and/or save/replace a link to content 1050.

The user may open a folder, for example folder 1025a, by clicking on the folder to display the list of links to content contained in the folder. As shown in FIG. 11, a user may open folder 1025a "About AOL" to reveal a list of links to content 1120a-1120d, including a link to "Member Services: General Help" 1120b. Generic entries may be provided as default links to content, and the entries may be varied from user to user.

Figure 12:
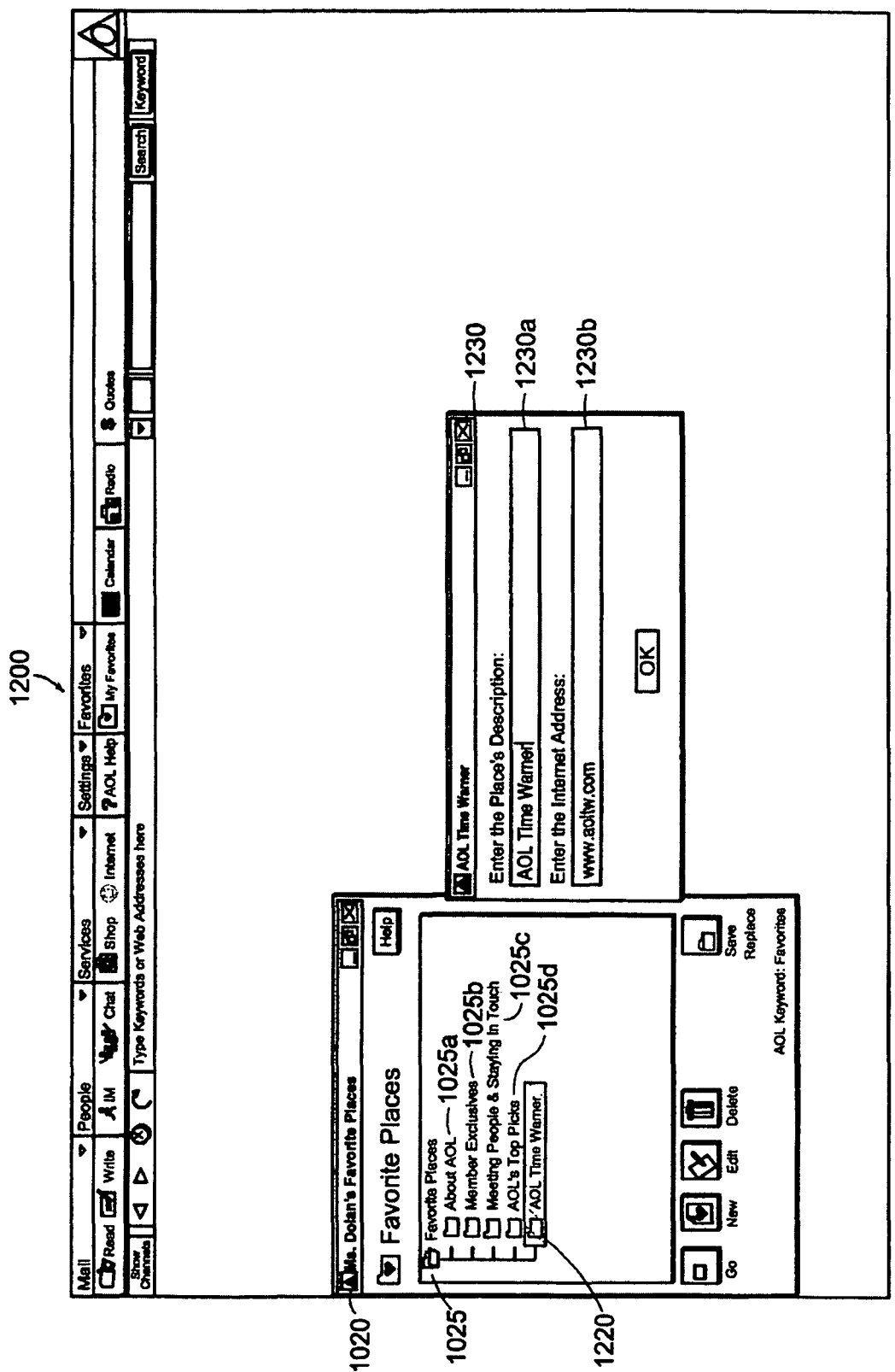

As shown in FIG. 12, a UI 1200 may display further information 1230 about a link to content 1220, such as, for example, the description 1230a and Internet address 1230b of the link. As also shown in FIG. 12, a user may add or modify a link to content 1220 by providing new information 1230.

In comparison to FIG. 9A, FIG. 9B shows an implementation of a UI 900B for a child user of age 12 or under. The UI 900B includes a menu control dropdown button 905 labeled "Favorites" that, when selected, renders a dropdown menu 920 that includes a menu item labeled "Kids Only Main" 920a. The dropdown menu 920 includes links to age appropriate content. To display the "Favorite Places" menu control, the user 802a clicks on the menu item 920a or simultaneously presses the ALT key and the underlined letter in the icon. Also, a menu button 925 labeled "KO Fun Spots" (shown in FIG. 10B) is available as a shortcut to the menu item 920a. When the child user selects menu item 920a or selects menu button 925, a UI 1000B may be prepared and rendered.

As shown in FIG. 10B, a customized UI 1000B for a child user may be prepared by populating a designated area 1060 of the UI 1000B with a listing of links to content that are chosen based upon the user profile information associated with the user. For example, links to a child user's Kids Only Favorites 1065 may be prepared and, for children of age 12 or under, or users designated as a child of age 12 or under, may be further chosen from a pre-approved list of links to content. One or more of the links to content may be shown as a direct link to the content (for example, links 1065a through 1065j). The child user may be prevented from modifying the links to content (for example, see the lack of buttons in FIG. 10B corresponding to buttons 1030-1050 in FIG. 10A).

The user 802a requests access to content listed in the "Favorite Places" 1020, 1060 by, for example, clicking on the link (for example, 1120b or 1065a) in the "Favorite Places" graphical user interface 1020, 1060 or by clicking on the "Go" button 1030 in the "Favorite Places" graphical user interface 1020 (step 840).

The host 804 responds by providing access to the desired content appearing in the "Favorite Places" control based upon the user profile information (step 845). For example, the host may permit the user 802a to have access to content listed in the "Favorite Places" graphical user interface rather than blocking access to that content. Because the links appearing in the "Favorite Places" graphical user interface were placed there based on the user profile information, these links are presumed to be authorized, appropriate, and/or desirable for the user 802a to view.

The user 802a may provide updated "Favorite Places" information to the host 804 (step 850). For example, the user 802a may seek to add, modify, or delete a link to content in the "Favorite Places" control. For example, the user may seek to add a new link to content by clicking on the "New" button 1035 in the "Favorite Places" graphical user interface 1020. A parental controls feature may be employed to screen the requested addition based on the user's user profile information and only add the new link if it is permitted based on the user profile information. For example, if the user 802a is designated a child of age 12 years old or under, or has somehow been designated as a child of age 12 or under, the user may be forbidden to add new links altogether or specifically identified in a block list, or new links may be restricted to add only links included or identifiable from a pre-approved list of links. The user 802a may seek to modify a link by, for example, clicking on the "Edit" button 1040 in the "Favorite Places" graphical user interface 1020. Again, a parental controls feature may be employed to screen the requested modification based on the user's user profile information and only add the new link if it is permitted based on the user profile information. The user 802a may seek to delete a link by, for example, clicking on the "Delete" button 1045 in the "Favorite Places" graphical user interface 1020. Also, the user 802a may seek to save or replace the link by, for example, clicking of the "Save/Replace" button 1050 in the "Favorite Places" graphical user interface 1020.

The host 804 stores the updated favorite places information for the user 802a (step 855). The host 804 may store the updated favorite places information in, for example, a database 154 on the host, a memory 172 or mass storage device 170a on the client 160, 140a, or another suitable storage medium and/or location.

The user 802a requests access to the updated content listed in the "Favorite Places" 1020, 1060 by, for example, clicking on the link in the "Favorite Places" graphical user interface 1020, 1060 or by clicking on the "Go" button 1030 in the "Favorite Places" graphical user interface 1020 (step 860). The host 704 responds by providing access to the desired updated content appearing in the "Favorite Places" control based upon the user profile information (step 865). For example, the host may permit the user 802a to have access to updated content listed in the "Favorite Places" graphical user interface rather than blocking access to that content.

The techniques, methods and systems described here may find applicability in any computing, processing or network environment in which a user interface provides users with access to content or functionality. Various implementations of these systems and techniques may be realized in digital electronic circuitry, or in computer hardware, firmware, software, or in combinations thereof.

A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

Furthermore, although a number of implementations have been described, it will be understood that various modifications may be made. For example, a user interface may include dropdown menus (see, for example, FIG. 9A) or separate windows (see, for example, FIG. 10A). Moreover, the distinction made between an adult and a child in some of the described implementations is merely for the purpose of demonstrating the ability to vary the degree of access to content or authorization to modify access to content based on an attribute of classification of users. For example, other groupings such as student, teacher, administrator, or staff and management may be used in place of age or maturity. Accordingly, other implementations are within the scope of the following claims.

What is claimed is:

1. A method comprising:

accessing, by a processor, first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;

based on the accessed first user profile information, automatically customizing a first user interface for the first user by including a first toolbar control in a toolbar of the first user interface that provides access to a first set of pre-designated references to content selected based on the first user profile information, the first toolbar control being selectable from the first user interface without having to first select another toolbar control;

accessing, by the processor, second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information; and based on the accessed second user profile information, automatically customizing a second user interface for the second user by including a second toolbar control that is not included among the toolbar controls included in the first user interface customized for the first user, wherein the second toolbar control of the second user interface customized for the second user is selectable from second user interface without having to first select another toolbar control and provides access to a second set of pre-designated references to content selected based on the second user profile information.

2. The method of claim 1, wherein:

the one or more actions of the first user comprise launching an application or frequently accessing or requesting content or services.

3. The method of claim 2, wherein the first user profile information includes information indicating that the first user is a child and the second user profile information includes information indicating that the second user is an adult.

4. The method of claim 3, wherein the second toolbar control included in the second user interface customized for the second user that is not included in the first user interface customized for the first user comprises a toolbar button selectable by the second user to access particular electronic content deemed appropriate for an adult but not appropriate for a child.

5. The method of claim 4, wherein the toolbar button is selectable by the second user to access at least one of stock quote information or weather information.

6. The method of claim 3, wherein the second toolbar control included in the second user interface customized for the second user that is not included in the first user interface customized for the first user comprises a toolbar drop-down menu selectable by the second user to access a set of links to particular electronic content deemed appropriate for an adult but not appropriate for a child.

7. The method of claim 6, further comprising enabling the second user to manually add or remove links from the set of links in the toolbar drop-down menu.

8. The method of claim 3, wherein the second toolbar control included in the second user interface customized for the second user that is not included in the first user interface customized for the first user comprises a toolbar button or a toolbar drop-down menu selectable by the second user to make an online purchase.

9. The method of claim 1, wherein the second toolbar control included in the second user interface customized for the second user that is not included in the first user interface customized for the first user comprises a toolbar button selectable by the second user to access particular electronic content deemed appropriate for the second user but not appropriate for the first user.

10. The method of claim 9, further comprising enabling the second user to manually add or remove links from the set of links in the toolbar drop-down menu.

11. The method of claim 1, wherein the second toolbar control included in the second user interface customized for the second user that is not included in the first user interface customized for the first user comprises a toolbar drop-down menu selectable by the second user to access a set of links to particular electronic content deemed appropriate for the second user but not appropriate for the first user.

12. The method of claim 1, wherein the second toolbar control included in the second user interface customized for the second user that is not included in the first user interface customized for the first user comprises a toolbar button or toolbar drop-down menu selectable by the second user to make an online purchase.

13. A method comprising:

identifying, by at least one processor, from among multiple user groups, a first user group associated with a first user, the multiple groups comprising groups based on one or more of age, maturity, characteristics determined or inferred based upon one or more actions of users, interests of users, or organizational positions of users;

automatically customizing, by the at least one processor, a first user interface for the first user by including a first toolbar control in a toolbar menu of the first user interface based on the identified first user group, wherein the first toolbar control of the toolbar menu is selectable from the first user interface without having to first select another toolbar control and remains visible in the first user interface while the first user interface is being displayed;

providing the first user interface customized for the first user to the first user;

identifying, by at least one processor, from among multiple user groups, a second user group associated with a second user;

automatically customizing, by the at least one processor, a second user interface for the second user by including a second toolbar control in the toolbar menu of the second user interface based on the identified second user group, wherein the second toolbar control of the toolbar menu:

is not included among the toolbar controls included in the first user interface customized for the first user;

is selectable from the toolbar menu of the second user interface without having to first select another toolbar control; and remains visible in the second user interface while the second user interface is being displayed.

14. The method of claim 13, wherein the multiple groups comprise multiple age groups, each age group being associated with a different toolbar menu.

15. The method of claim 14, wherein the multiple groups comprise an adult age group and a child age group, the adult age group being associated with a first toolbar menu and the child age group being associated with a second toolbar menu.

16. The method of claim 15, wherein the first toolbar menu includes at least one toolbar button not included in the second toolbar menu, the toolbar button being user-selectable to access particular electronic content deemed appropriate for adults.

17. The method of claim 15, wherein the first toolbar menu includes at least one toolbar drop-down menu not included in the second toolbar menu, the toolbar drop-down menu including a set of links user-selectable to access particular electronic content deemed appropriate for adults.

18. The method of claim 15, wherein the first toolbar menu includes at least one toolbar button or toolbar drop-down menu not included in the second toolbar menu, the toolbar button or toolbar drop-down menu being user selectable to make an online purchase.

19. The method of claim 13, wherein the multiple groups comprise a first group and a second group, the first group being associated with a first toolbar menu and the second group being associated with a second toolbar menu, the first toolbar menu including at least one toolbar button not included in the second toolbar menu, the toolbar button being user-selectable to access particular electronic content deemed appropriate for users in the first group and not appropriate for users in the second group.

20. The method of claim 13, wherein the multiple groups comprise a first group and a second group, the first group being associated with a first toolbar menu and the second group being associated with a second toolbar menu, the first toolbar menu including at least one toolbar drop-down menu not included in the second toolbar menu, the at least one toolbar drop-down menu including a set of links user-selectable to access particular electronic content deemed appropriate for users in the first group and not appropriate for users in the second group.

21. The method of claim 13, wherein the multiple groups comprise a first group and a second group, the first group being associated with a first toolbar menu and the second group being associated with a second toolbar menu, the first toolbar menu including at least one toolbar drop-down menu or toolbar button not included in the second toolbar menu, the at least one toolbar drop-down menu button or toolbar button being user-selectable to make an online purchase.

22. An apparatus comprising:
a memory device that stores a set of instructions; and
at least one processor, the set of instructions being executable by the at least one processor to cause the apparatus to perform a method comprising:
accessing first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;
accessing second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information;
based on the accessed first user profile information, automatically customizing a first user interface for the first user to include a first toolbar control that is selectable from a toolbar of the first user interface without having to first select another toolbar control and provides access to a first set of pre-designated references to content selected based on the first user profile information; and
based on the accessed second user profile information, automatically customizing a second user interface for the second user to include a second toolbar control that is not included among the toolbar controls included in the first user interface customized for the first user, and wherein the second toolbar control of the second user interface customized for the second user is selectable from the toolbar of the second user interface without having to first select another toolbar control and provides access to a second set of pre-designated references to content selected based on the second user profile information.

23. A method comprising:
accessing, by a processor, first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;
based on the accessed first user profile information, automatically customizing a first user interface for the first user;
providing the first user interface customized for the first user to the first user;
enabling access to content in response to manipulation of the first user interface customized for the first user;
accessing, by the processor, second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information;
based on the accessed second user profile information, automatically customizing a second user interface for the second user to include a second toolbar control that:
is not included among the toolbar controls included in the first user interface customized for the first user;
remains visible in the second user interface customized for the second user while the second user interface customized for the second user is being displayed; and
is selectable from a toolbar of the second user interface without having to first select another toolbar control;
providing the second user interface customized for the second user to the second user; and
enabling access to content in response to manipulation of the second user interface customized for the second user.

24. A method comprising:
accessing, by a processor, first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;

based on the accessed first user profile information, automatically customizing a first user interface for the first user by including a first toolbar control that:
- is selectable from a toolbar of the first user interface without having to first select another toolbar control; and
- provides access to a first set of pre-designated references to content that are selected based on the first user profile information;

accessing, by the processor, second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information; and based on the accessed second user profile information, automatically customizing a second user interface for the second user by including a second toolbar control that is not included among the toolbar controls included in the first user interface for the first user, wherein the second toolbar control:
- is selectable from the toolbar of the second user interface without having to first select another toolbar control; and
- provides access to a second set of pre-designated references to content selected based on the second user profile information.

25. A method comprising:

accessing, by a processor, first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;

based on the accessed first user profile information, automatically customizing, by the processor, a first user interface for the first user by including at least one toolbar control that is selectable from a toolbar of the first user interface without having to first select another toolbar control and that includes one or more links to content appropriate to the first user based on the accessed first user profile information;

providing the first user interface customized for the first user to the first user;

enabling access to content in response to manipulation of the first user interface customized for the first user;

accessing, by the processor, second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information;

based on the accessed second user profile information, automatically customizing a second user interface for the second user by including a second toolbar control that is not included among the toolbar controls included in the first user interface customized for the first user, wherein the second toolbar control:
- remains visible while the second user interface customized for the second user is being displayed; and
- is selectable from the toolbar of the second user interface without having to first select another toolbar control;

providing the second user interface customized for the second user to the second user; and enabling access to content in response to manipulation of the second user interface customized for the second user.

26. A method comprising:

accessing, by a processor, first user profile information associated with a first user, the first user profile information comprising one or more of information indicative of an age or a level of maturity of the first user, a category of interest to the first user, a characteristic determined or inferred based upon one or more actions of the first user, a location associated with the first user, or a name of the first user;

based on the accessed first user profile information, automatically customizing, by the processor, a first user interface for the first user to include a first toolbar control that is selectable from a toolbar of the first user interface without having to first select another toolbar control and that includes pre-designated references to content selected based on the first user profile information;

accessing, by the processor, second user profile information associated with a second user, the second user profile information comprising one or more of information indicative of an age or a level of maturity of the second user, a category of interest to the second user, a characteristic determined or inferred based upon one or more actions of the second user, a location associated with the second user, or a name of the second user, wherein the second user profile information is different from the first user profile information; and based on the accessed second user profile information, automatically customizing a second user interface for the second user, wherein the second user interface customized for the second user includes a second toolbar control that is not included among the toolbar controls included in the first user interface customized for the first user, and wherein the second toolbar control of the second user interface customized for the second user is selectable from a toolbar of the second user interface without having to first select another toolbar control and provides access to a second set of pre-designated references to content selected based on the second user profile information.

* * * * *